(12) United States Patent
Yu et al.

(10) Patent No.: US 11,659,639 B2
(45) Date of Patent: May 23, 2023

(54) POWER CONTROL CIRCUIT, DRIVE SYSTEM, AND POWER CONTROL METHOD

(71) Applicant: Shanghai Bright Power Semiconductor Co., Ltd., Shanghai (CN)

(72) Inventors: Wei-Jia Yu, Shanghai (CN); Min-Min Fan, Shanghai (CN); Feng Qi, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 382 days.

(21) Appl. No.: 17/086,889

(22) Filed: Nov. 2, 2020

(65) Prior Publication Data

US 2021/0068229 A1 Mar. 4, 2021

Related U.S. Application Data

(63) Continuation of application No. PCT/CN2019/070575, filed on Jan. 7, 2019.

(30) Foreign Application Priority Data

May 1, 2018 (CN) .......................... 201810406982.2

(51) Int. Cl.
 *H05B 45/345* (2020.01)
 *H05B 45/36* (2020.01)
 *H05B 47/16* (2020.01)

(52) U.S. Cl.
 CPC ........... *H05B 45/36* (2020.01); *H05B 45/345* (2020.01); *H05B 47/16* (2020.01)

(58) Field of Classification Search
 CPC ........ H05B 45/10; H05B 45/30; H05B 45/31; H05B 45/36; H05B 45/345; H05B 47/10; H05B 47/16
 See application file for complete search history.

(56) References Cited

U.S. PATENT DOCUMENTS

2009/0284182 A1* 11/2009 Cencur .............. H05B 41/3924
                                                            315/307
2015/0028775 A1    1/2015 Zudrell-Koch

FOREIGN PATENT DOCUMENTS

CN      105813260 A      7/2016
CN      105848370 A      8/2016
(Continued)

*Primary Examiner* — Jimmy T Vu
(74) *Attorney, Agent, or Firm* — Muncy, Geissler, Olds & Lowe, P.C.

(57) ABSTRACT

The present invention provides a power control circuit which has a timing unit used for timing an elapsed time of current half cycle of the phase-cut AC power supply signal, outputting a current accumulated timing duration, and outputting a first control signal at a starting moment when a starting point of a half cycle of the AC power supply signal is detected; a regulating unit connected to the timing unit and comprising a temporary storage module, wherein a final reference time interval is stored in the temporary storage module, and when the current accumulated timing duration reaches the final reference time interval, the regulating unit outputs a second control signal; and a control unit connected to the detection unit and the regulating unit and used for controlling current in a load based on the first control signal and the second control signal.

18 Claims, 13 Drawing Sheets

(56) References Cited

FOREIGN PATENT DOCUMENTS

| | | |
|---|---|---|
| CN | 106557201 A | 4/2017 |
| CN | 107124787 A | 9/2017 |
| CN | 107623968 A | 1/2018 |
| CN | 108770130 A | 11/2018 |

\* cited by examiner

POWER CONTROL CIRCUIT, DRIVE SYSTEM, AND POWER CONTROL METHOD

CROSS-REFERENCE TO RELATED APPLICATIONS

This application is a continuation of co-pending International Patent Application No. PCT/CN2019/070575, filed on Jan. 7, 2019, which claims the priority to Chinese Patent Application No. 2018104069822, filed May 1, 2018, the contents of which are incorporated herein by reference in their entirety.

FIELD OF THE INVENTION

The present application relates to the technical field of drive circuits, particularly to a power control circuit, a drive system, and a power control method.

BACKGROUND OF THE INVENTION

A phase-cut dimmer is a device which can regulate effective power of an alternating current (AC) through regulating a phase angle interval of the AC which is in a conductive state. In a dimmable LED lighting equipment, an LED light is dimmed by a phase-cut dimmer. Nowadays, there are two types of phase-cut dimmers, a forward phase-cut dimmer and a rearward phase-cut dimmer. The forward phase-cut dimmer uses a triac circuit in which voltage chopping can be input from an AC phase of 0°. When the triac circuit is in a conductive state, there is a voltage input. The principle thereof is regulating conduction angles of each half wave of the AC to change sinusoidal waveforms, so as to change effective values of the AC, so as to perform the dimming process. The rearward phase-cut dimmer uses a metal-oxide-semiconductor (MOS) circuit in which the MOS is turned on from an AC phase of 0°, and is turned off at a certain phase and the turned on again at an AC phase of 180°.

In the actual phase-cut dimmer, as influenced by characteristics of components, a phase angle corresponding to each power frequency cycle at the conduction stage or non-conduction stage will fluctuate, and the phase difference of phase angles between a front half period and a rear half period in each power frequency cycle at the conduction stage or non-conduction stage cannot keep 180°, such that the stroboscopic phenomenon can be occurred easily when the LED light is working.

SUMMARY OF THE INVENTION

In view of the above shortcomings in the prior art, the objective of the present application is to provide a power control circuit, a drive system, and a power control method, so as to solve the problem that the stroboscopic phenomenon can be occurred in an LED lighting equipment with a phase-cut dimmer.

In order to realize the above objective and other related objectives, in one embodiment, the present application provides a power control circuit utilized in a circuit system, wherein the circuit system is configured to apply a phase-cut alternating current (AC) power signal processed by a phase-cut dimmer to drive a load, and wherein the power control circuit is coupled to a power supply line at an output side of a rectifier in the circuit system, wherein the rectifier converts the phase-cut AC power signal into a direct current (DC) power supply signal which has a first waveform and a second waveform during a half cycle of the phase-cut AC power signal, the power control circuit comprising: a timing unit, configured to calculate an elapsed time of a current half cycle of the phase-cut AC power supply signal and to output a currently accumulated timing result accordingly, and further to output a first control signal when a starting point of a half cycle of the phase-cut AC power supply signal is detected; a regulating unit, connected to the timing unit, and the regulating unit comprising a register, wherein the register is configured to store a final reference time interval, and wherein the regulating unit is configured to output a second control signal when the elapsed time of the current half cycle of the phase-cut AC power supply signal reaches the final reference time interval; and a control unit, connected to the timing unit and the regulating unit, and the control unit configured to control a current passing through the load based on the first control signal and the second control signal.

In some embodiments, the timing unit comprises a zero-crossing detector, a timer connected to the zero-crossing detector, and a first logic module connected to the zero-crossing detector, wherein the zero-crossing detector is configured to detect a zero-crossing point of the DC power supply signal and output a detection signal to indicate a first period corresponding to the first waveform and a second period corresponding to the second waveform; and wherein the timer is configured to calculate the elapsed time of the current half cycle of the phase-cut AC power supply signal according to a signal edge of the detection signal; and wherein the first logic module is configured to output the first control signal to indicate the starting point of a half cycle of the phase-cut AC power supply signal and a switching point of based on the signal edge of the detection signal.

In some embodiments, the timer comprises one of a digital timer or an analog timer, wherein the digital timer comprises a counter connected to the zero-crossing detector with a reset terminal, and further to receive a clock signal with a clock terminal, and the counter is configured to count a number of pulses on the clock signal within the current half cycle of the phase-cut AC power supply signal based on the signal edge of the detection signal; and wherein the analog timer comprises a capacitor connected to the zero-crossing detector, and the capacitor is charged based on the signal edge of the detection signal, and wherein the analog timer determines an elapsed time of the current half cycle of the phase-cut AC power supply signal according to a peak voltage crossing the capacitor.

In some embodiments, the first logic module is further connected to a reset terminal of the timer, and wherein the timer is reset based on the first control signal.

In some embodiments, the control unit is configured to control a switch circuit to enter into a conductive state or a non-conductive state based on the first control signal and the second control signal.

In some embodiments, the timing unit comprises a second logic module configured to output an update control signal at an end point of the first waveform during a half cycle of the phase-cut AC power supply signal, and wherein the power control circuit further comprises an updating unit connected to the timing unit and the register, and wherein the updating unit is configured to detect an error between a duration of the first waveform during the current half cycle of the phase-cut AC power supply signal and an original reference time interval stored temporarily, and to update the original reference time interval when the error exceeds a preset error threshold.

In some embodiments, the register comprises a first reference register and a second reference register, and wherein the first reference register and the second reference register are respectively configured to temporarily store a first reference time intervals corresponding to odd half cycles of the phase-cut AC power supply signal and a second reference time interval corresponding to even half cycles of the phase-cut AC power supply signal; and wherein the regulating unit further comprises a selector connected to the first reference register and the second reference register, and the regulating unit is configured to select either the first reference time interval or the second reference time interval as an original reference time interval applied to determine the final reference time interval.

In some embodiments, the timing unit comprises a second logic module and a third logic module, and wherein the second logic module is configured to output an update control signal at an ending point of the first waveform during a half cycle of the phase-cut AC power supply signal, and wherein the third logic module is configured to output an odd control signal and an even control signal when the starting point of a half cycle of the phase-cut AC power supply signal is detected; and wherein the power control circuit further comprises an updating unit which comprises a first updating module and a second updating module; and wherein the first updating module is connected to the first reference register, the second logic module and the third logic module, and the first updating module is configured to detect a first error between the currently accumulated timing result and the first reference time interval at least based on the update control signal and the odd control signal, and to update the first reference time interval in the first reference register when the first error exceeds a first preset error threshold; and wherein the second updating module is connected to the second reference register, the second logic module and the third logic module, and the second updating module is configured to detect a second error between the currently accumulated timing result and the second reference time interval at least based on a the update control signal and the even control signal, and to update the second reference time interval in the second reference register when the second error exceeds a second preset error threshold.

In some embodiments, the regulating unit further comprises a comparison module connected to the timing unit and configured to compare the currently accumulated timing result with the final reference time interval and to accordingly output the second control signal.

In some embodiments, the register is further configured to store a fluctuation time interval, and wherein the regulating unit further comprises a regulating module configured to incorporate the fluctuation time interval with the original reference time interval to generate the final reference time interval and provide the final reference time interval to the comparison module.

Further, in one embodiment, the present application provides a drive system comprising: a rectifier, configured to converting a phase-cut alternating current (AC) power signal into a direct current (DC) power supply signal; a switch circuit, arranged in a switching power supply and configured to switch between a conductive state and a non-conductive state; and the power control circuit, configured to control the switching circuit.

Further, in one embodiment, the present application provides a power control method, utilized in a circuit system wherein the circuit system is configured to apply a phase-cut alternating current (AC) power signal processed by a phase-cut dimmer to drive a load, the power control method comprises: calculating an elapsed time of a current half cycle of the phase-cut AC power supply signal to output a currently accumulated timing result accordingly, and further outputting a first control signal when a starting point of a half cycle of the phase-cut AC power supply signal is detected; outputting a second control signal when currently accumulated timing result reaches a final reference time interval; and controlling a current passing through the load based on the first control signal and the second control signal.

In some embodiments, the step of calculating an elapsed time of a current half cycle of the phase-cut AC power supply signal to output a currently accumulated timing result accordingly, and further outputting a first control signal when a starting point of a half cycle of the phase-cut AC power supply signal is detected further comprises the following steps: detecting a zero-crossing point of the DC power supply signal and output a detection signal to indicate a first period corresponding to a first waveform and a second period corresponding to a second waveform; and calculating the elapsed time of the current half cycle of the phase-cut AC power supply signal according to a signal edge of the detection signal; and outputting the first control signal to indicate the starting point of a half cycle of the AC power supply signal.

In some embodiments, the power control method further comprising the steps of: outputting an update control signal at an end point of the first waveform during a half cycle of the phase-cut AC power supply signal; and detecting an error between a currently accumulated timing result and an original reference time interval stored temporarily updating the original reference time interval when the error exceeds a preset error threshold.

In some embodiments, the power control method further comprising: temporarily storing a first reference time intervals corresponding to odd half cycles of the phase-cut AC power supply signal and a second reference time interval corresponding to even half cycles of the phase-cut AC power supply signal; selecting either the first reference time interval or the second reference time interval as an original reference time interval applied to determine the final reference time interval.

In some embodiments, the step of outputting a second control signal when the currently accumulated timing result reaches a final reference time interval comprises a step of comparing the currently accumulated timing result with the final reference time interval to output the second control signal accordingly.

In some embodiments, the step of outputting the second control signal when the currently accumulated timing result reaches a final reference time interval further comprises a step of incorporating a fluctuation time interval with the original reference time interval to generate the final reference time interval.

In some embodiments, the power control method further comprises the steps of: outputting an update control signal at an ending point of the first waveform, and outputting an odd control signal and an even control signal when the starting point of a half cycle of the AC power supply signal is detected; detecting a first error between the currently accumulated timing result and a first reference time interval at least based on the update control signal and the odd control signal to update the first reference time interval when the first error exceeds a first preset error threshold; and detecting a second error between the currently accumulated timing result and a second reference time interval at least based on the update control signal and the even control signal to updating the second reference time interval when the second error exceeds a second preset error threshold

DETAILED DESCRIPTION OF THE PREFERRED EMBODIMENTS

Implementations of the present application will be described below through specific embodiments, and those skilled in the art can easily understand other advantages and effects of the present application from the contents disclosed in the present specification.

In addition, the terms "first", "second", etc. are used herein to describe various elements in some examples, these elements should not be limited by these terms. These terms are only used to distinguish one element from another. Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Figure 1:
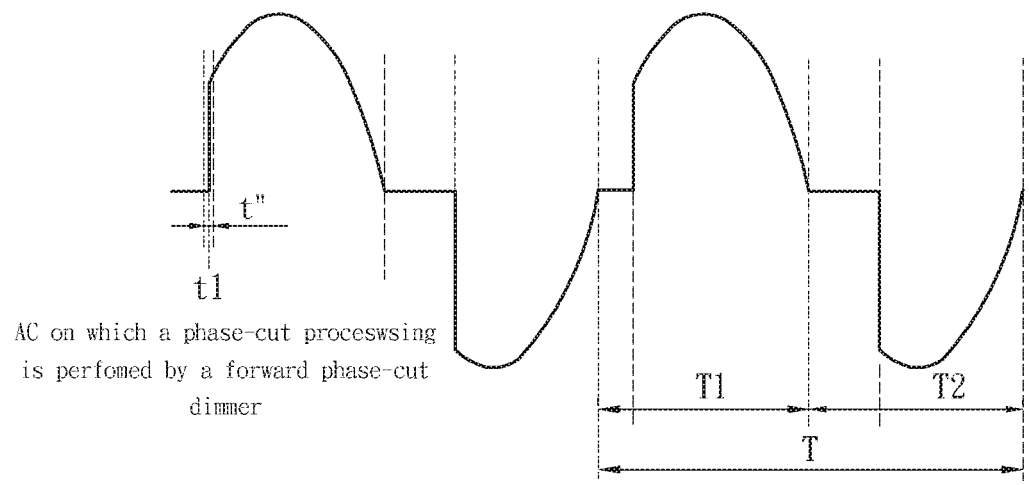
FIG. 1 shows a waveform diagram of an alternating current (AC) on which a phase-cut processing is performed by a forward phase-cut.
Figure 2:
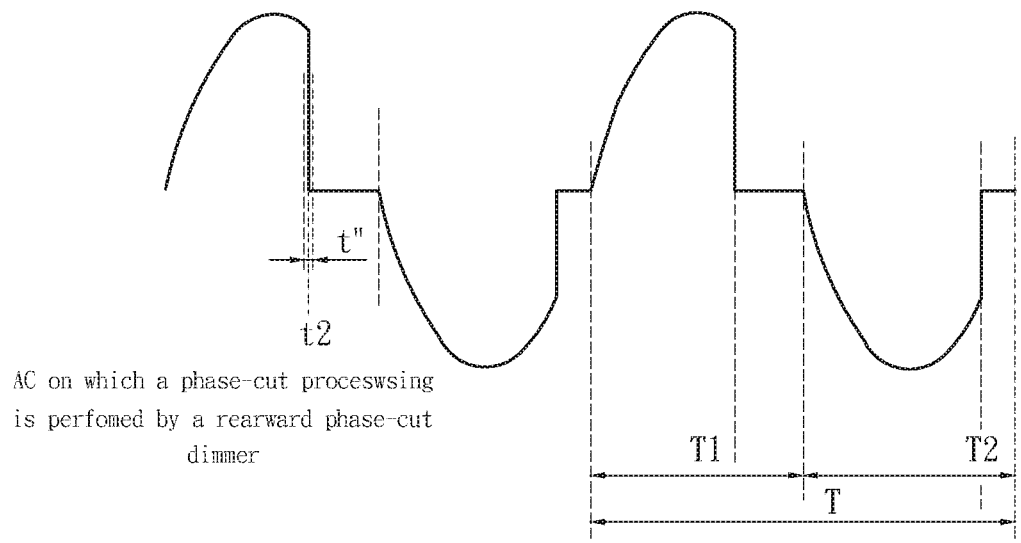
FIG. 2 shows a waveform diagram of an AC on which a phase-cut processing is performed by a rearward phase-cut dimmer.

Please refer to FIG. 1 and FIG. 2 which show waveform diagrams of an alternating current (AC) on which a phase-cut processing is performed by a forward phase-cut dimmer and a rearward phase-cut dimmer respectively. It can be seen from the figures that an phase angle of AC in the forward phase-cut dimmer at a conductive time (t1) and an phase angle of AC in the rearward phase-cut dimmer at a non-conductive time (t2) fluctuate in an interval (t"). Meanwhile, during a power frequency cycle (T), the difference between the phase angle regulated by the forward phase-cut dimmer in the front half period (T1) and the phase angle regulated by the forward phase-cut dimmer in the rear half period (T2) is not 180 degrees. Please refer to FIG. 3 which shows a waveform diagram of a power supply signal on a power supply line and a load current signal in lighting equipment with a forward phase-cut dimmer. Due to the above two conditions, the waveform of the power supply signal which is transmitted to the power supply line of a load after processing by a circuit system in lighting equipment is as shown by $V_{BUS}$ in FIG. 3, and the waveform of the current signal in a load line which is subjected to linear compensation based on the waveform of power supply signal is as shown by $I_{DRAIN}$ in FIG. 3. An LED light is operated according to power supply duration (t) and power supply duration (t'), which are not uniform in length as shown by $I_{DRAIN}$ waveform, for a long time, causing discomfort of human eyes due to stroboscopic phenomenon.

Figure 4:
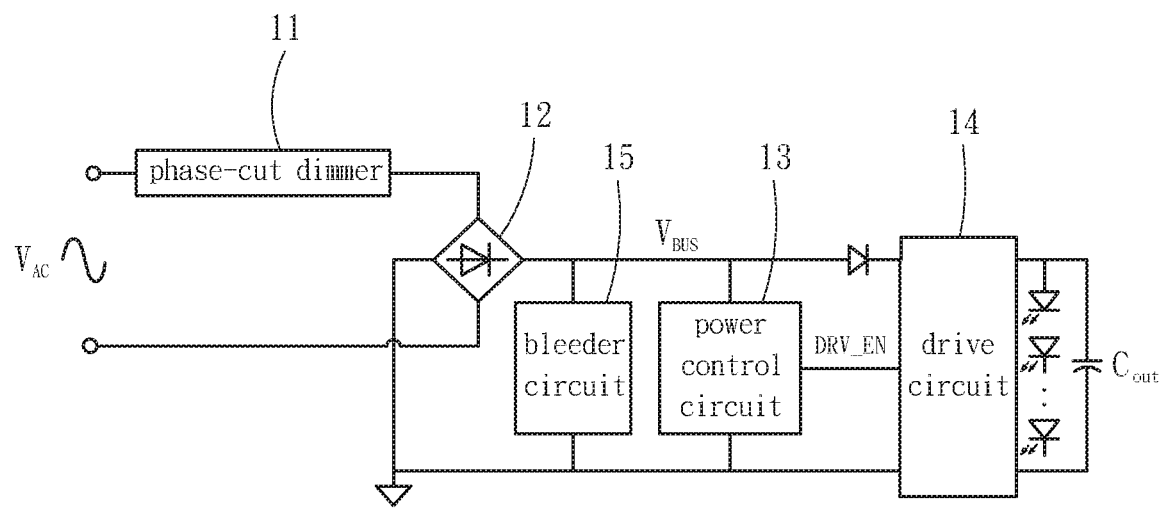
FIG. 4 shows a structural diagram of a circuit system in one embodiment.

In order to solve the above problem, the present application provides a power control circuit, which is utilized in a circuit system. The circuit system is configured to apply a phase-cut AC power signal processed by a phase-cut dimmer 11 to drive a load. Please refer to FIG. 4 which shows a structural diagram of a circuit system in one embodiment. The circuit system includes all kinds of the circuits which need to be connected when an LED light is driven by the phase-cut AC. The circuit system includes but is not limited to a rectifier 12, a drive circuit 14, a power control circuit 13, a leakage protection circuit (i.e., bleeder circuit 15), a phase-cut dimmer detector (not shown), and so on. The drive circuit 14 includes a linear compensation circuit and a switch circuit.

The power control circuit 13 is coupled to a power supply line at an output side of the rectifier 12 in the circuit system. The rectifier 12 converts the phase-cut AC power signal into a DC power supply signal, wherein the DC power supply signal has a first waveform and second waveform during a half cycle of the phase-cut AC power signal. The first waveform is the waveform output during the phase-cut dimmer is in a conductive state or the waveform output during the phase-cut dimmer is in a non-conductive state. The second waveform is other one of the waveform output during the phase-cut dimmer is in a conductive state or the waveform output during the phase-cut dimmer is in a non-conductive state.

Figure 3:
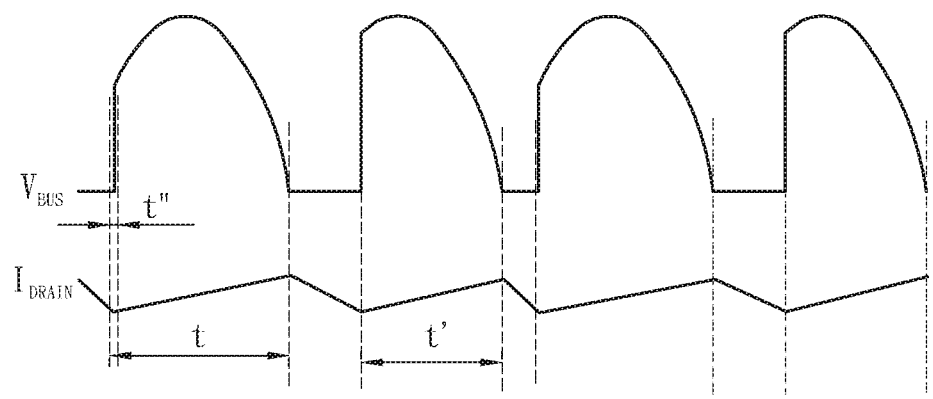
FIG. 3 shows a waveform diagram of a power supply signal on a power supply line and a load current signal in lighting equipment with a forward phase-cut dimmer.

In order to eliminate the problem of stroboscopic phenomenon generated after the phase-cut dimmer performs phase-cut processing on an phase-cut AC, the present application provides a power control circuit to extend the waveform output during the phase-cut dimmer is in a non-conductive state, or to cut part of the waveform output when the phase-cut dimmer is in a conductive state, so that jittering generated among interval (such as an interval (t") as shown in FIG. 3) adjacent to a chopping phase angle within each unit interval of the phase-cut dimmer can be eliminated, and the time intervals of waveform output within each unit interval during the conductive state are uniform.

Figure 5:
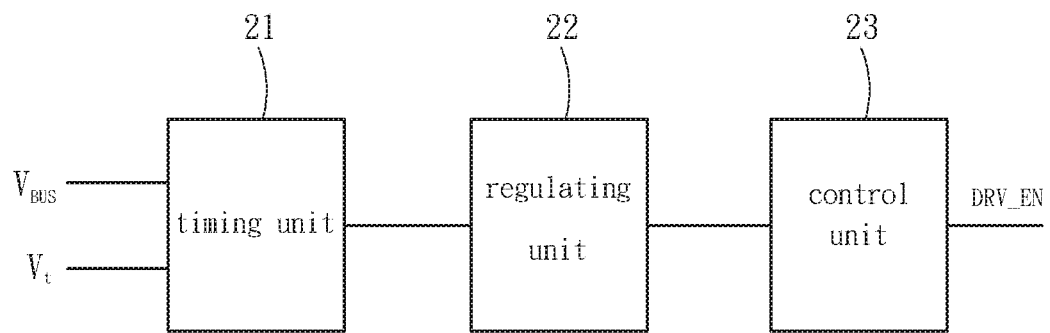
FIG. 5 shows a structural diagram of a power control circuit in one embodiment.

Please refer to FIG. 5 which shows a structural diagram of the power control circuit in one embodiment. The power control circuit includes a timing unit 21, a regulating unit 22 and a control unit 23.

The timing unit 21 is configured to calculate an elapsed time of a current half cycle of the phase-cut AC power supply signal and to output a currently accumulated timing result accordingly, and further to output a first control signal when a starting point of a half cycle of the phase-cut AC power supply signal is detected. The timing unit 21 is directly connected with a power supply line that is coupled to an output terminal of the rectifier, so as to acquire the voltage of the power supply signal ($V_{BUS}$), or acquire the voltage of the power supply signal ($V_{BUS}$) of the power supply line after voltage division is performed via a sampling resistor.

Herein, the timing unit 21 takes the unit interval as a timing period, and the timing unit 21 is configured to calculate an elapsed time of a current half cycle of the AC power supply signal and output the accumulated timing result according. During the calculation, the timing unit 21 further detects the starting point of a half cycle of the phase-cut AC power supply signal, and outputs the first control signal when the starting point is detected. Therefore, the timing unit 21 includes two circuit modules used for timing and detecting respectively, wherein the circuit module used for calculating is configured to determine an elapsed time of a current half cycle of the phase-cut AC power supply signal through detecting the voltage of power supply signal ($V_{BUS}$), and output the currently accumulated timing result within the timing period. The circuit module used for detecting is configured to determine the starting point of a half cycle of the phase-cut AC power supply signal through detecting the voltage of power supply signal ($V_{BUS}$).

Figure 6:
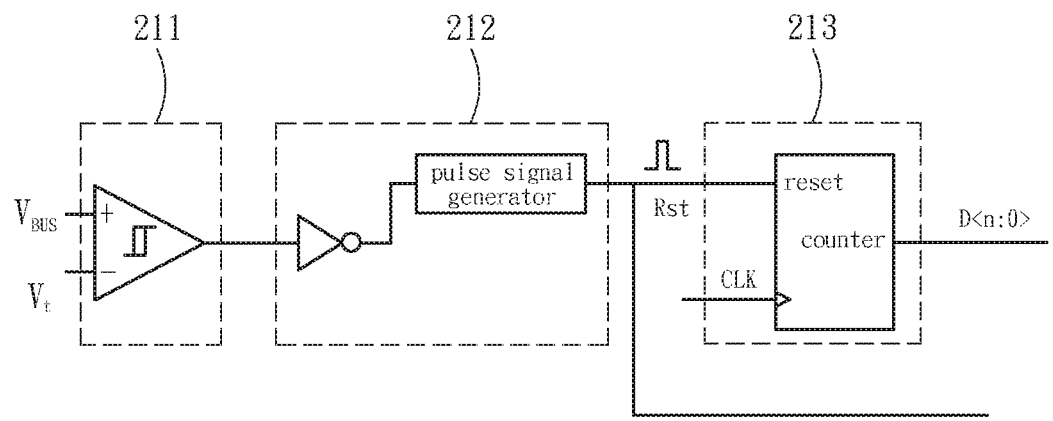
FIG. 6 shows a circuit structural diagram of a timing unit in the power control circuit in one embodiment.

In some embodiment, the timing unit 21 includes a zero-crossing detector 211 and a timer 213 as shown in FIG. 6.

The zero-crossing detector 211 is configured to detect a zero-crossing point of the DC power supply signal, and output a detection signal for indicating a first period corresponding to the first waveform and a second period corresponding to the second waveform. In one embodiment, the zero-crossing detector includes a comparator, wherein one input terminal of the comparator receives the voltage of the power supply signal ($V_{BUS}$), and the other input terminal receives a reference voltage ($V_t$), and the comparator outputs a corresponding detection signal through comparing the voltage of the power supply signal ($V_{BUS}$) with the reference voltage ($V_t$). The detection signal is indicated by a high level and a low level. For example, a positive input terminal of the comparator receives the voltage of the power supply signal ($V_{BUS}$), and a negative input terminal receives the reference voltage ($V_t$), when the voltage of the power supply signal ($V_{BUS}$) is higher than the reference voltage ($V_t$), the comparator outputs a high level, otherwise, the comparator outputs a low level. With the comparator as an example, for the detection signal output by the zero-crossing detector, a high level represents the waveform of a phase-cut dimmer in the conductive period, and a low level represents the waveforms of the phase-cut dimmer in the non-conductive period.

It should be noted that, those skilled in the art should understand that, according to actual circuit design, the zero-crossing detector 211 uses the high level and the low level to correspondingly represent waveforms of the phase-cut dimmer in a non-conductive period and in a conductive period which are opposite to those shown above, which will not be described in detail herein.

The timer 213 is connected with the zero-crossing detector 211, and is configured to calculate the elapsed time of the current half cycle of the phase-cut AC power supply signal according to an edge of the detection signal. The timer 213 is provided with a reset terminal, and reset is triggered based on a rising edge or a falling edge of the detection signal, the timer 213 restarts to calculate the elapsed time of a new half cycle of the phase-cut AC power supply signal In some embodiments, the timer 213 performs calculating operation by counting the number of pulses of clock signals. In one embodiment, the timer 213 includes a counter, wherein the counter is connected with the zero-crossing detector 211 with a reset terminal, and is configured to receive a clock signal with a clock terminal, and configured to count a number of pulses on the clock signal within the current half cycle based on the signal edge of detected detection signal. For example, when a reset terminal of the counter receives a rising edge of pulse signal generated based on the signal edge of detection signal, the counter is reset, and restarts to count the number of pulses of received clock signals from the falling edge of pulse signal.

In some other embodiments, the timer 213 includes a timer which is designed based on an analogue circuit. The timer contains a capacitor and charging and discharging circuit thereof. The timer is connected with the zero-crossing detector 211, and charges the capacitor based on a signal edge of the detected detection signal, and determines the accumulated timing result according to the peak voltage at which the capacitor is charged. For example, when a reset terminal of the counter receives a rising edge of pulse signal generated based on the signal edge of detection signal, the capacitor in the counter is discharged, and when a falling edge of the pulse signal is received, the capacitor starts to be charged. The voltage of the capacitor is processed by an analogue-digital converter and output as a voltage value represented by n which is a binary number (D<n:0>), wherein n is greater than 0, and based on a linear relationship between a preset capacitor capacity and a charging duration, the output voltage value represents the currently accumulated timing result.

Figure 7:
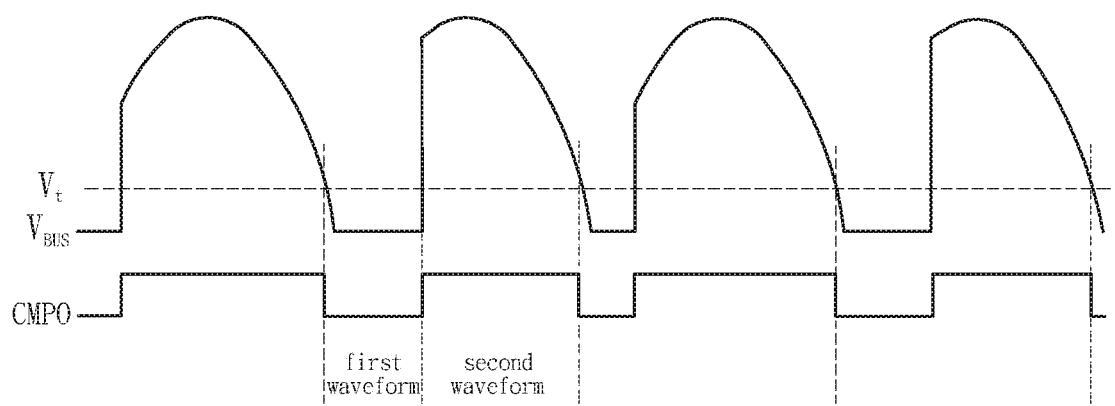
FIG. 7 shows waveform diagram of a power supply signal on a power supply line after being processed by a forward phase-cut dimmer and a rectifying circuit and waveform diagram of a detection signal output by a zero-crossing detection module.

For precisely timing the elapsed time of a half cycle, the timer 213 should be reset at the start point of each half cycle. Therefore those skilled in the art can design a signal edge of detection signal corresponding to resetting signal of the timer 213 based on the type of the phase-cut dimmer. Please refer to FIG. 7 which shows waveform diagram of a power supply signal on a power supply line after being processed by a forward phase-cut dimmer and a rectifier and waveform diagram of a detection signal output by a zero-crossing detector 211. As shown in FIG. 7, for the forward phase-cut dimmer, the falling edge of the detection signal is correspond to that the forward phase-cut dimmer terminates the conductive state and there is no phase fluctuation, therefore, the reset terminal of the timer 213 is activated at the falling edge of the detection signal. Please refer to FIG. 8 which shows waveform diagram of a power supply signal on a power supply line after being processed by a rearward phase-cut dimmer and a rectifier and waveform diagram of a detection signal output by a zero-crossing detector 211. As shown in the FIG. 8, for the rearward phase-cut dimmer, the rising edge of the detection signal is correspond to that the rearward phase-cut dimmer starts the conductive state and there is no phase fluctuation, therefore, the reset terminal of the timer 213 is activated at the rising edge of the detection signal.

Figure 8:
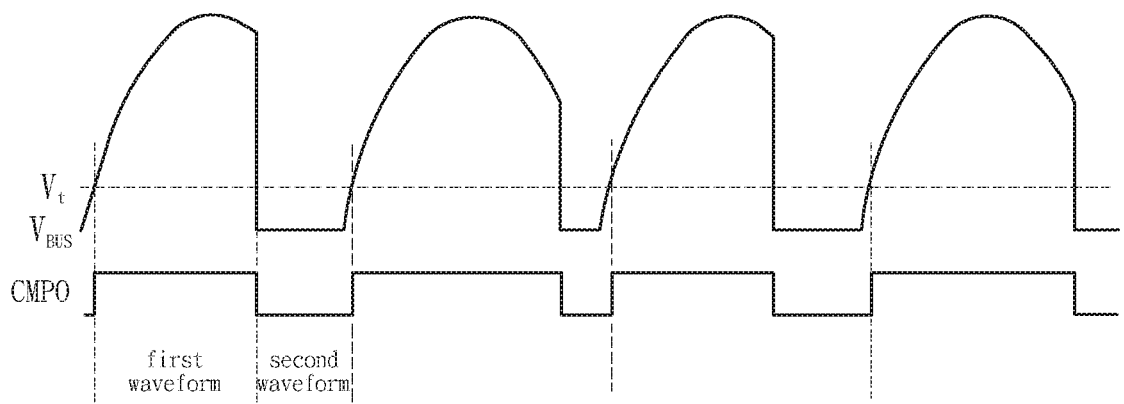
FIG. 8 shows waveform diagram of a power supply signal on a power supply line after being processed by a rearward phase-cut dimmer and a rectifying circuit and waveform diagram of a detection signal output by a zero-crossing detection module.

It should be noted that, since the waveforms of power supply signals processed by the forward phase-cut dimmer and the rearward phase-cut dimmer are different, the first waveform and the second waveform in the present application can be distinguished. It is defined that a waveform starting from the starting point of the half cycle is called the first waveform, and the first waveform is turned into the second waveform after a phase-cut processing is performed by the phase-cut dimmer. In the power supply signal as shown in FIG. 7, during a half cycle, a waveform output by the forward phase-cut dimmer in its non-conductive period is called the first waveform, and a waveform output by the forward phase-cut dimmer in its conductive period is called the second waveform. In the power supply signal as shown in FIG. 8, during a half cycle, a waveform output by the rearward phase-cut dimmer in its conductive period is called the first waveform, and a waveform output by the rearward phase-cut dimmer in its non-conductive period is called the second waveform. Correspondingly, the timer 213 starts to time the elapsed time of the current half cycle of the phase-cut AC power supply signal from the signal edge corresponding to the starting point of a half cycle, i.e., the starting point of the first waveform.

Please referring to FIG. 6 which shows a circuit structural diagram of the timing unit 21 in the power control circuit in one embodiment. The timing unit 21 further includes a first logic module 212.

The first logic module 212 is connected to the zero-crossing detector 211, and is configured to output the first control signal (Rst) to indicate the starting point of the first waveform based on the signal edge of the detection signal. Based on the type of phase-cut dimmer, the first waveform is related to the control logic represented by the first control signal (Rst). For example, if the first waveform is the waveform of the forward phase-cut dimmer in a non-conductive state, the first control signal (Rst) is used for instructing the control unit to disconnect the switch circuit in the circuit system, such that the current passing through the load declines from its peak value. For another example, if the first waveform is the waveform of the rearward phase-cut dimmer in a conductive state, the first control signal (Rst) is used for instructing the control unit to conduct the switch circuit in the circuit system, such that the current flowing through the load rises from its peak value.

Herein, the first logic module 212 is designed according to the first waveform and second waveform which are respectively represented by a high level and a low level output by the zero-crossing detector 211, such that the first logic module 212 detects a signal edge corresponding to the starting point of the first waveform and outputs the first control signal (Rst). In one embodiment, as shown in FIG. 7, the low level output by the zero-crossing detector 211 represents the first waveform, and the high level represents the second waveform. The first logic module 212 outputs the first control signal (Rst) at a falling edge of detection signal. Correspondingly, the first logic module 212 includes a pulse signal generator which is triggered based on a falling edge; or the first logic module 212 includes an inverter and a pulse signal generator which is triggered based on a rising edge. The first control signal (Rst) output by the first logic module 212 is the pulse signal. In another embodiment, as shown in FIG. 8, the high level output by the zero-crossing detector 211 represents the first waveform, the low level represents the second waveform, and the first logic module 212 outputs the first control signal (Rst) at a rising edge of the detection signal. Correspondingly, the first logic module 212 includes a pulse signal generator which is triggered based on a rising edge; or the first logic module 212 includes an inverter and a pulse signal generator which is triggered based on a falling edge. The first control signal (Rst) output by the first logic module 212 is the pulse signal.

It should be noted that, the structure of the first logic module 212 is merely exemplary, rather than limiting the present application. In fact, the first logic module 212 can be designed according to the first waveform and the second waveform corresponding to the high level and the low level of the received detection signals.

As the timer 213 calculates the elapsed time of the current half cycle of the phase-cut AC power supply signal based on the signal edge at the starting point of the first waveform, the reset terminal of the timer 213 is connected with an output terminal of the first logic module 212, and the timer 213 resets the current timing operation based on the first control signal (Rst) output from the first logic module 212. The manners through which the timer 213 resets and restarts to time based on the first control signal (Rst) are the same as or similar to those described above, and will not be described herein.

The regulating unit 22 is connected with the timing unit 21, and the regulating unit 22 includes a register which stores a final reference time interval. The final reference time interval is a duration which is preset based on the duration during which the phase-cut dimmer is in the conductive state or in the non-conductive state. According to the first waveform detected by the timing unit, the final reference time interval is determined based on the duration of the first waveform during a half cycle and stored in the register. In some embodiments, the final reference time interval is set on basis of the duration of the first waveform during a half cycle plus or substract a phase angle error in order to block fluctuation of phase angle of phase-cut AC power supply signal occurred during adjacent half cycles. Take the forward phase-cut dimmer as an example, if the first waveform is corresponding to a non-conductive state of the forward phase-cut dimmer, the final reference time interval may be the sum of the duration of the first waveform during a half cycle plus a preset the phase angle error. Take the rearward phase-cut dimmer as an another example, if the first waveform is corresponding to a conductive state of the rearward phase-cut dimmer, the final reference time interval may be the difference between the duration of the first waveform during a half cycle and a phase angle error.

In other embodiments, in order to adapt all types of the dimming operations of the phase-cut dimmer, the register stores a plurality of final reference time intervals corresponding to different dimming levels, and the corresponding final reference time interval is selected based on the dimming level determined by the phase-cut dimmer.

In other embodiments, in order to response to the dimming operation of the phase-cut dimmer, the final reference time interval is updated timely based on the dimming operation of the phase-cut dimmer. The timing unit 21 further includes a second logic module; and the power control circuit further includes an updating unit.

The second logic module is configured to output an update control signal at the ending point of the first waveform during a half cycle. Herein, the second logic module detects the ending point of the first waveform based on the signal edge of the detection signal output by the zero-crossing detector and output the update control signal. In one embodiment, please refer to FIG. 9 which shows a circuit structural diagram of the timing unit 21 in the power control circuit of a forward phase-cut dimmer. For a detection signal (CMPO) output by the zero-crossing detector 211, a low level represents the first waveform, and a high level represents the second waveform. The second logic module 214 determines the ending point of the first waveform based on a rising edge of the detection signal, wherein the second logic module 214 includes a rising edge-based pulse signal generator. In another embodiment, please refer to FIG. 10 which shows a circuit structural diagram of a timing unit 21' in a power control circuit of a rearward phase-cut dimmer. For the detection signal output by a zero-crossing detector 211', a high level represents the first waveform, and a low level represents the second waveform. A second logic module 214' determines the ending point of the first waveform based on a falling edge of the detection signal, wherein the second logic module 214' includes a falling edge-based pulse signal generator.

Figure 9:
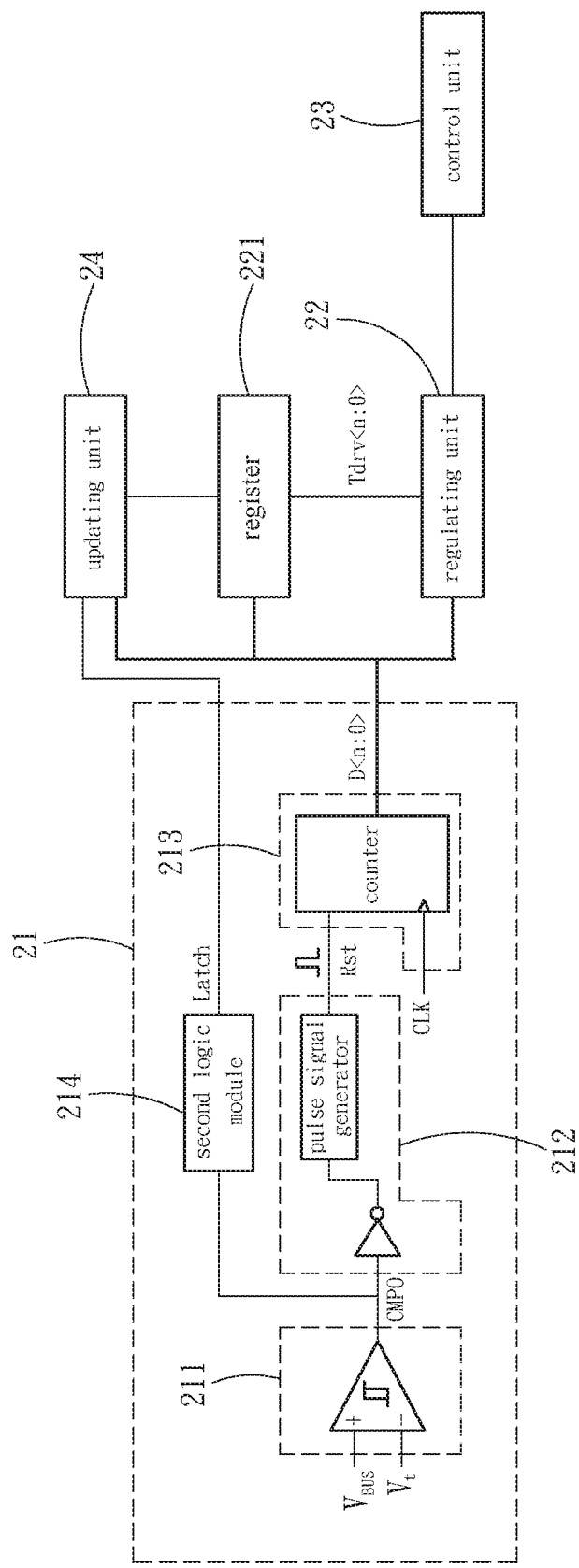
FIG. 9 shows a circuit structural diagram of a timing unit in a power control circuit of a forward phase-cut dimmer.
Figure 10:
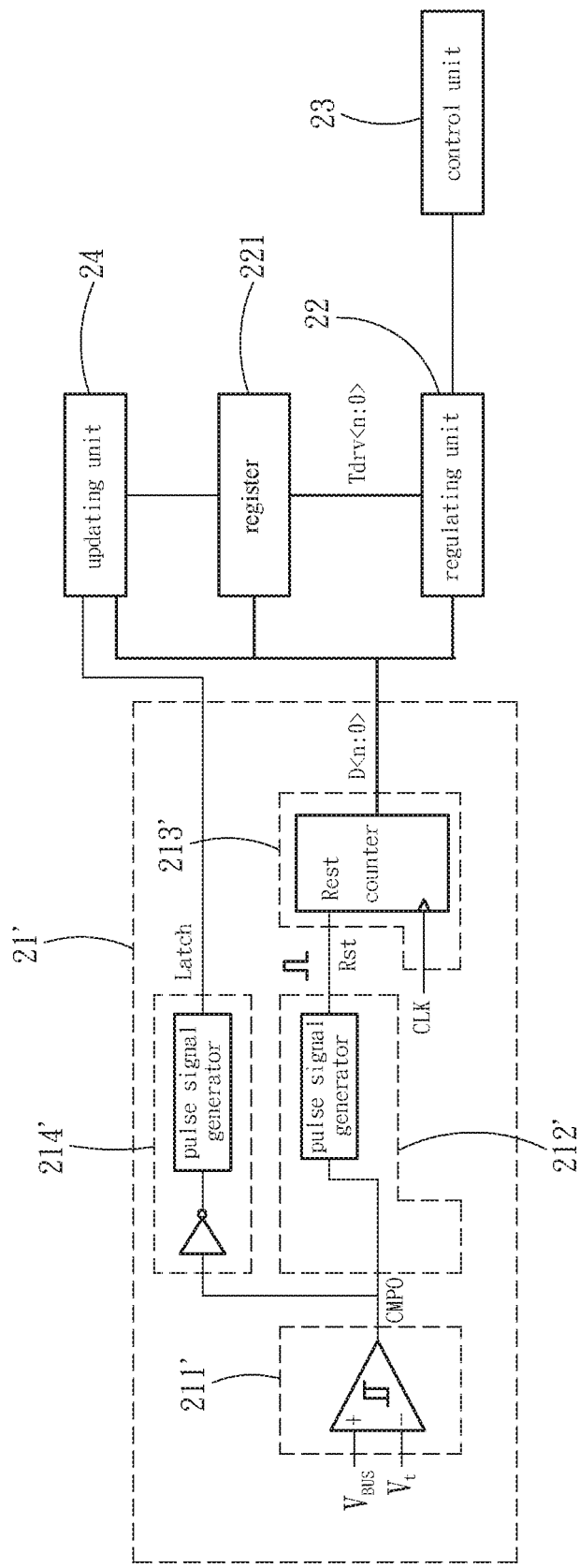
FIG. 10 shows a circuit structural diagram of a timing unit in a power control circuit of a rearward phase-cut dimmer.

As shown in FIG. 9 and FIG. 10, the updating unit 24 is connected with the timing unit 21 (or 21') and a register 221, and the updating unit 24 is configured to detect the error between the duration of the first waveform during the current half cycle and an original reference time interval stored temporarily, and update the original reference time interval in the register when the error exceeds a preset error threshold. The final reference time interval is equal to or determined by the original reference time interval.

The updating unit 24 is connected to a second logic module 214 (or 214') and a timer 213 (or 213'), and is configured to read the currently accumulated timing result by the timer 213 (or 213') when the update control signal is received (for example, pulse signal), and is configured to compare the timing result with the original reference time interval, and to apply the currently accumulated timing result to refresh the original reference time interval when a difference between the currently accumulated timing result and the original reference time interval exceeds a preset error threshold. Therefore, the updating unit 24 includes multi-level logic module which includes a comparator and a logic device group, or a logic processing module containing microcontroller unit (MCU).

In a circuit system which includes a dimmer detector, the updating unit further updates the original reference time interval based on a detection signal representing type of dimmer provided by the dimmer detector and the update control signal. For example, based on the update control signal and detection signal representing type of dimming in the forward phase-cut dimmer, the updating unit detects whether the error between an original reference time interval for the forward phase-cut dimmer and the currently accumulated timing result of a half cycle exceeds an error threshold corresponding to the forward phase-cut dimmer, if so, the original reference time interval for the forward phase-cut dimmer is updated, if not, the original reference time interval is kept unchanged. For another example, based on the update control signal and detection signal representing type of dimming in the rearward phase-cut dimmer, the updating unit detects whether the error between a original reference time interval for the rearward phase-cut dimmer and the currently accumulated timing result exceeds an error threshold corresponding to the rearward phase-cut dimmer, if so, the original reference time interval for rearward phase-cut dimmer is updated, if not, the original reference time interval is kept unchanged. Since the phase angles between two adjacent half cycles of AC power supply signal are different as discussed above, the error threshold set in the updating unit is redundant with difference durations of the first waveform in adjacent half cycles, so as to lower updating frequency and reduce discomfortableness of human eyes caused by stroboscopic phenomenon of lights.

Under the condition that the phase angles of adjacent half cycles of phase-cut AC power supply signal are different, in some other embodiments, the register may include a first reference register and a second reference register which are respectively configured to temporarily store a first reference time intervals (T1) corresponding to odd half cycles and a second reference time intervals (T2) corresponding to even half cycles. The regulating unit further includes a selector which is connected with both the first reference register and the second reference register, and the selector is configured to select either the first reference register or the second reference register as an original reference time interval applied to determine the final reference time interval.

The first reference time interval and the second reference time interval respectively stored in the first reference register and the second reference register are stored by the ways described above correspondingly, and will not be described herein.

The selector sets a selection logic according to a conductive state or non-conductive state of the phase-cut dimmer indicated by the first waveform. In one embodiment, the first waveform indicates that the waveform of the forward phase-cut dimmer is in a non-conductive state, the selector selects a larger one from the first and the second reference time intervals. In another embodiment, the first waveform indicates that the waveform of the rearward phase-cut dimmer is in a conductive state, the selector selects a smaller one from the first and the second reference time intervals. In view of this, not only fluctuation of the phase angle between adjacent half cycles can be avoided, but also the duration of the first waveform within each half cycle can be unified.

For updating each reference time interval in the first reference register and the second reference register, in some embodiments, the timing unit 21 further includes a third logic module, wherein the third logic module is configured to output an odd control signal and an even control signal when the starting point of the first waveform is detected. The updating unit updates the first reference register or second reference register based on the odd control signal or the even control signal correspondingly. In some embodiments, the updating unit correspondingly includes a first updating module and a second updating module. The first updating module is connected to the first reference register, the second logic module and the third logic module, and the first updating module is configured to detect a first error between the currently accumulated timing result and the first reference time interval stored in the first reference register based on a control logic determined through combining the update control signal and the odd control signal, and to update the first reference time interval in the first reference register when the first error exceeds a first preset error threshold. The second updating module is connected to the second reference register, the second logic module and the third logic module, and the second updating module is configured to detect a second error between the currently accumulated timing result and the second reference time interval based on a control logic determined through combining the update control signal and the even control signal, and to update the second reference time interval in the second reference register when the second error exceeds a preset error threshold.

For example, the third logic module includes a 1-bit counter and receives pulse signals output from the first logic module, wherein the 1-bit counter counts based on the pulse signals. The first updating module includes a logic device group which performs logic processing based on the update control signal, the first control signal and the odd control signal. The second updating module includes a logic device group which performs logic processing based on the update control signal, the first control signal and the even control signal. When the counted number is an odd number, the odd control signal is shifted to high level, and when the counted number is an even number, the even control signal is shifted to high level. Taking the first updating module as an example, when the update control signal and the odd control signal are all high level, the first updating module detects a first error between the currently accumulated timing result and the first reference time interval stored in the first reference register, and updates the first reference time interval in the first reference register when the first error exceeds a preset error threshold. The working process of the second updating module is similar to that of the first updating module and will not be described herein.

When the currently accumulated timing result reaches the final reference time interval, the regulating unit outputs the second control signal. The final reference time interval is determined by the original reference time interval which is timely updated by the updating unit, thereby dimming operations of users on the phase-cut dimmer can be responded in real time.

According to the type of phase-cut dimmer, when the currently accumulated timing result reaches the final reference time interval, it is indicated that, based on the first control signal, the load can avoid the influence incurred by different phase angles between two adjacent half cycles. When the currently accumulated timing result of the timing unit reaches the final reference time interval, the regulating unit outputs the second control signal.

In one embodiment, the regulating unit further includes a comparison module. The comparison module performs a bit-by-bit comparison in real time on a binary number which is output by the timing unit and is used for describing the currently accumulated timing result and another binary number which is used for describing the final reference time interval. When a compared result shows that the two numbers are equal, the comparison module outputs the second control signal. The comparison module includes a plurality of comparators and a logic device group, wherein each comparator compares the binary number corresponding to the currently accumulated timing result and the binary number corresponding to the final reference time interval, and the output terminals of all the comparators are connected with the logic device group. When the levels output by all the comparators conform to a logic based on which the logic device group outputs the second control signal, the second control signal is output. Herein, as required by actual logic design, the logic device group includes at least one logic device, and corresponding logic configuration is realized through electric connection between each logic device. The logic device includes but is not limited to an AND gate, an OR gate, a NAND gate, a NOT gate, an encoder, a decoder and a selector.

In some of the embodiments mentioned above, the final reference time interval is obtained based on the detection of the duration of the first waveform. In order to avoid fluctuation occurred from different phase angles between two adjacent half cycles, the regulating unit further includes a regulating module which is configured to incorporate a fluctuation time interval which is prestored in a register with the original reference time interval to generate the final reference time interval, and provide the final reference time interval to the comparison module.

In one embodiment that the first waveform is detected as a waveform of the forward phase-cut dimmer which is in a non-conductive state, the regulating module includes an adder which is configured to add the fluctuation time interval into the original reference time interval, and provide the result to the comparison module, so that the load circuit can be disabled when the fluctuation is occurred. In another embodiment that the first waveform is detected as a waveform of the rearward phase-cut dimmer which is in a conductive state, the regulating module includes a subtractor which is configured to subtract the fluctuation time interval from the reference time interval, and provide the result to the comparison module, so that the load circuit can be disabled when the fluctuation is occurred.

The control unit is connected to the timing unit and the regulating unit, and is configured to control the current passing through the load based on the first control signal and the second control signal.

The control unit outputs a control signal to control the circuit system according to a circuit structure thereof, wherein the circuit system is used to control the power supply of the load. Specifically, the control unit outputs an enable signal which is used for controlling the circuit system to connect or disconnect the load from power For the forward phase-cut dimmer, the control unit outputs an enable signal to control the circuit system to be in a non-conductive state based on the first control signal, and the control unit outputs an enable signal tp control the circuit system to be in a conductive state based on the second control signal. For the rearward phase-cut dimmer, the control unit outputs an enable signal to control the circuit system to be in a conductive state based on the first control signal, and the control unit outputs an enable signal to control the circuit system to be in a non-conductive state based on the second control signal.

In a circuit system in which the power supply of a load is controlled by a switch circuit, the control unit controls the switch circuit to be conductive or non-conductive based on the first control signal and second control signal. An output terminal of the control unit is connected with a control terminal of the switch circuit. The control terminal includes a control terminal of a switch unit in the switch circuit (for example, a gate of a switch power tube), or a control terminal of a drive unit in the switch circuit (for example, an enable terminal of a driving amplifier). In a case of the phase-cut dimmer is a forward phase-cut dimmer, the switch unit includes a gate-driven switch power tube, and the control unit includes a trigger and a switch device, wherein a set terminal of the trigger receives the second control signal, a reset terminal of the trigger receives the first control signal, and an output terminal of the trigger is connected with a control terminal of the switch device. When the reset terminal of the trigger receives the first control signal, the trigger outputs a low level to control the switch device to be conductive, such that the switch power tube is forcibly turned off; and when the set terminal of the trigger receives the second control signal, the trigger outputs a high level to control the switch device to be non-conductive, such that the switch power tube is turned on, wherein the switch power tube can be also controlled by other switch control circuits in the circuit system. In a case of the phase-cut dimmer is a rearward phase-cut dimmer, the switch device includes a gate-driven switch power tube, the control unit includes a trigger and a switch device, wherein a set terminal of the trigger receives the first control signal, the reset terminal of the trigger receives the second control signal, and an output terminal of the trigger is connected with a control terminal of the switch device. When the set terminal of the trigger receives the first control signal, the trigger outputs a high level to control the switch device is controlled to be non-conductive, such that the switch power tube is turned on, wherein the switch power tube can be also controlled by other switch control circuits in the circuit system. When the reset terminal of the trigger receives the second control signal, the trigger outputs a low level to control the switch device to be conductive, such that the switch power tube is forcibly turned off.

In one embodiment, an output terminal of the control unit is connected to an input terminal of the switch circuit, wherein the input terminal of the switch circuit is connected to an input terminal of the drive unit (for example, an input terminal of a driving amplifier). For example, the output terminal of the control unit is connected to the input terminal of the driving amplifier, and when the control unit controls the input terminal of the driving amplifier to be grounded based on the first control signal or second control signal which is used for disconnecting the switch circuit, the switch circuit is forcibly disconnected, otherwise, the switch circuit is conductive or is controlled by other circuits.

The other circuits include but are not limited to a switch control circuit which provides stable power supply for a load by using resonance, and a line voltage compensation circuit.

It should be noted that, the connection and circuit structure of the above control unit are merely exemplary, rather than limiting the present application. In fact, the control unit can perform more complex logic processing and output a conductive control signal or a non-conductive signal through combining with control logics of control signals of other switch circuits, which will not be described in detail herein.

Figure 11:
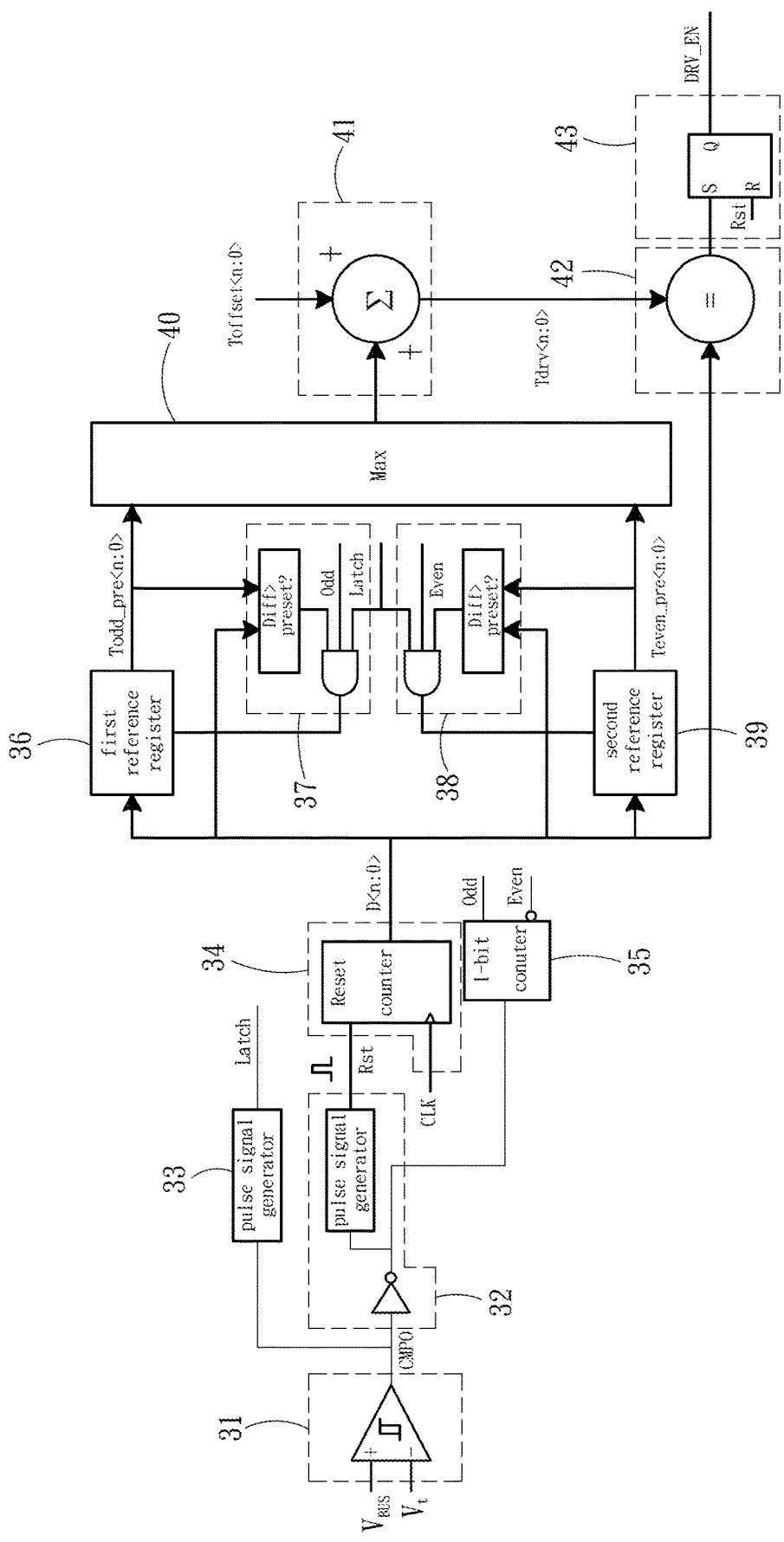
FIG. 11 shows a circuit structural diagram of a power control circuit in one embodiment.

Please refer to FIG. 11 which shows a circuit structural diagram of a power control circuit in one embodiment. The power control circuit controls the power of an electric signal which is processed by a forward phase-cut dimmer. The power control circuit includes a timing unit, an updating unit, a regulating unit and a control unit. The timing unit includes a zero-crossing detector 31, a timer 34, a first logic module 32, a second logic module 33 and a third logic module 35.

A positive input terminal of the zero-crossing detector 31 receives a voltage of a power supply signal ($V_{BUS}$) output by a rectifier, a negative input terminal of the zero-crossing detector 31 receives a reference voltage ($V_t$) of the zero-crossing detection, and an output terminal of the zero-crossing detector 31 outputs a detection signal. A high level of detection signal represents that the forward phase-cut dimmer is in a conductive state, and a low level of detection signal represents that the forward phase-cut dimmer is in a non-conductive state. The first logic module 32 outputs the first control signal (Rst) at a falling edge of detection signal, the timer 34 resets and calculates the currently accumulated timing result within the current half cycle based on the first control signal, and the third logic module 35 counts in odd-even numbers based on a falling edge of detection signal to output an odd control signal or an even control signal. The second logic module 33 outputs an update control signal (Latch) based on a rising edge of the detection signal.

The updating unit includes a first updating module 37 and a second updating module 38, and the regulating unit includes a first reference register 36 and a second reference register 39 correspondingly. The first updating module 37 is connected to the first reference register 36, the timer 34, the second logic module 33 and the third logic module 35; and the second updating module 38 is connected to the second reference register 39, the timer 34, the second logic module 33 and the third logic module 35. According to the update control signal and the odd control signal, the first updating module 37 compares the currently accumulated timing result output by the timer 34 and a first reference time interval stored in the first reference register 36 and determines whether an first error therebetween is greater than a preset error threshold, if so, the currently accumulated timing result is stored in the first reference register so as to update the first reference time interval. According to the update control signal and the even control signal, the second updating module 38 compares the currently accumulated timing result output by the timer 34 and a second reference time interval stored in the second reference register 39 and determines whether a second error therebetween is greater than a preset error threshold, if so, the currently accumulated timing result is stored in the second reference register 39 so as to update the reference time interval.

The regulating unit further includes a selector 40, a regulating module 41 and a comparison module 42. The selector 40 selects a maximum value from the first reference time interval and the second reference time interval, and the selector 40 outputs the maximum value as an original reference time interval to the regulating module 41. The regulating module 41 sums the original reference time interval and a preset fluctuation time interval to output a result as a final reference time interval to the comparison module 42. The comparison module 42 compares the currently accumulated timing result with the final reference time interval, and determines whether the currently accumulated timing result is equal to the final reference time interval, if so, the comparison module 42 outputs the second control signal.

An output terminal of the control unit 43 is connected to a control terminal of the switch circuit. When the control unit 43 receives the first control signal, the control unit 43 outputs a non-conductive control signal to the control terminal of the switch circuit; and when the control unit 43 receives the second control signal, the control unit 43 outputs a conductive control signal to the control terminal of the switch circuit. The switch circuit performs a conductive operation according to the conductive control signal, or performs a non-conductive operation according to the disconnecting control signal.

Figure 12:
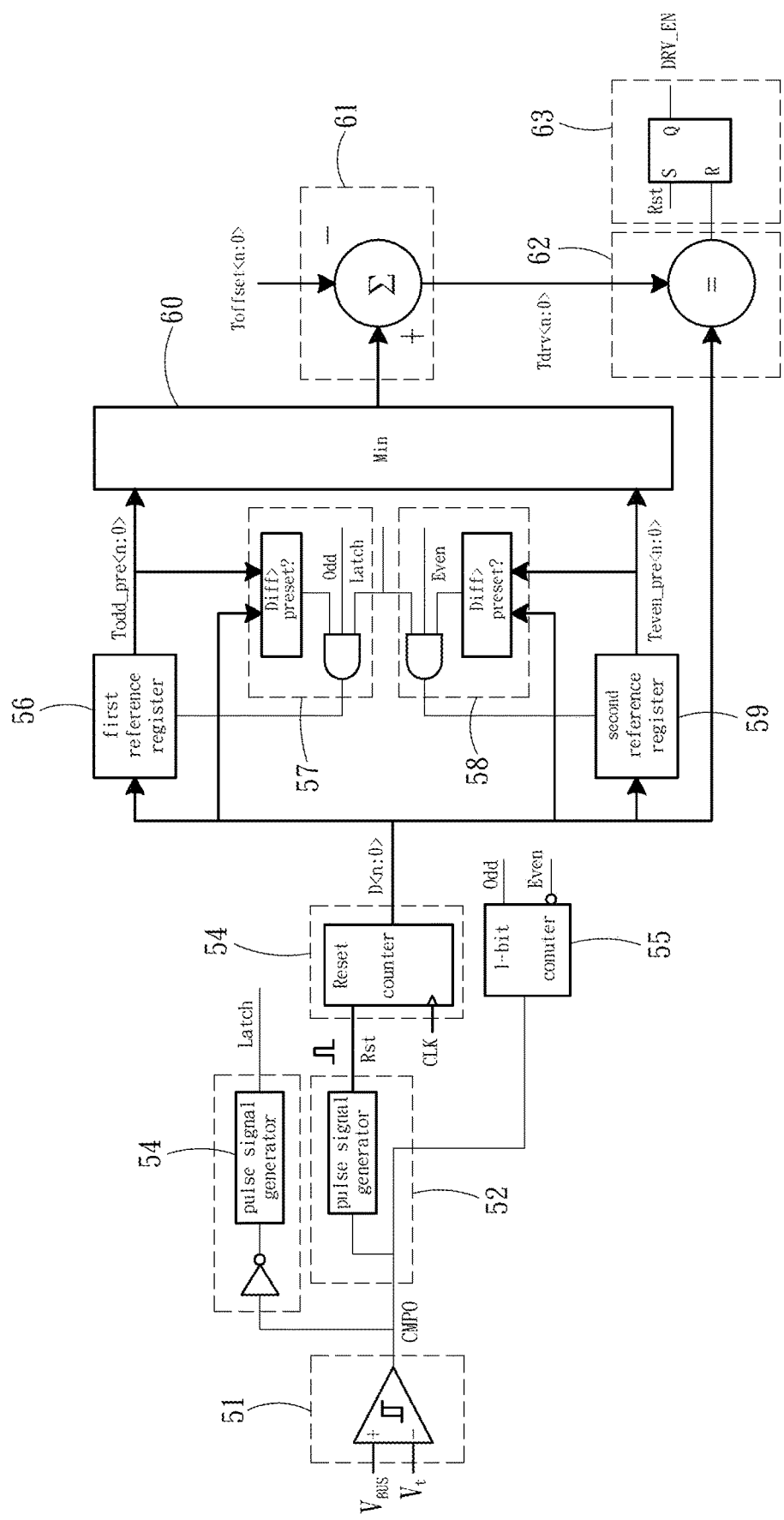
FIG. 12 shows a circuit structural diagram of a power control circuit in another embodiment.

Please refer to FIG. 12 which shows a circuit structural diagram of a power control circuit in one embodiment. The power control circuit controls an electric signal which is processed by a rearward phase-cut dimmer. The power control circuit includes a timing unit, an updating unit, a regulating unit and a control unit. The timing unit includes a zero-crossing detector 51, a timer 53, a first logic module 52, a second logic module 54 and a third logic module 55.

A positive input terminal of the zero-crossing detector 51 receives a voltage of a power supply signal ($V_{BUS}$) output by a rectifier, a negative input terminal of the zero-crossing detector 51 receives a reference voltage ($V_t$) in the zero-crossing detection, and an output terminal of the zero-crossing detector 51 outputs a detection signal. A high level of the detection signal represents that the rearward phase-cut dimmer is in a conductive state, a low level of the detection signal represents that the rearward phase-cut dimmer is in a non-conductive state. The first logic module 52 outputs the first control signal (Rst) at a rising edge of the detection signals, the timer 53 resets and calculates the currently accumulated timing result within the current half cycle of phase-cut AC power supply signal based on the first control signal, and the third logic module 55 counts in odd-even numbers based on a rising edge of detection signal to output an odd control signal or even control signal. The second logic module 54 outputs an update control signal (Latch) based on a falling edge of the detection signal.

The updating unit includes a first updating module 57 and a second updating module 58, and the regulating unit includes a first reference register 56 and a second reference register 59 correspondingly. The first updating module 57 is connected to the first reference register 56, the timer 53, the second logic module 54 and the third logic module 55; and the second updating module 58 is connected to the second reference register 59, the timer 53, the second logic module 54 and the third logic module 55. According to the update control signal and odd control signal, the first updating module 57 compares the currently accumulated timing result output by the timer 53 and a first reference time interval stored in the first reference register 56 and determines whether a first error therebetween is greater than a preset error threshold, if so, the currently accumulated timing result is stored in the first reference register so as to update the reference time interval. According to the update control signal and even control signal, the second updating module 58 compares the currently accumulated timing result output by the timer 53 and a second reference time interval stored in the second reference register 59 and determines whether a second error therebetween is greater than a preset error threshold, if so, the currently accumulated timing result is stored in the second reference register 59 so as to update the reference time interval.

The regulating unit further includes a selector 60, a regulating module 61 and a comparison module 62. The selector 60 selects a minimum value from the first reference time interval and the second reference time interval, and the selector 60 outputs the minimum value as an original reference time interval to the regulating module 61. The regulating module 61 subtracts the preset fluctuation time interval from the original reference time interval and outputs a result as a final reference time interval to the comparison module 62. The comparison module 62 compares the currently accumulated timing result with the final reference time interval and determines whether the currently accumulated timing result is equal to the final reference time interval, if so, the comparison module 62 outputs the second control signal.

An output terminal of the control unit 63 is connected to a control terminal of the switch circuit. When the control unit 43 receives the first control signal, the control unit 63 outputs a conductive control signal to the control terminal of the switch circuit; and when the control unit 43 receives the second control signal, the control unit 63 outputs a non-conductive control signal to the control terminal of the switch circuit. The switch circuit performs a conduction operation according to the conductive control signal, or performs a non-conductive operation according to the non-conductive control signal.

Figure 13:
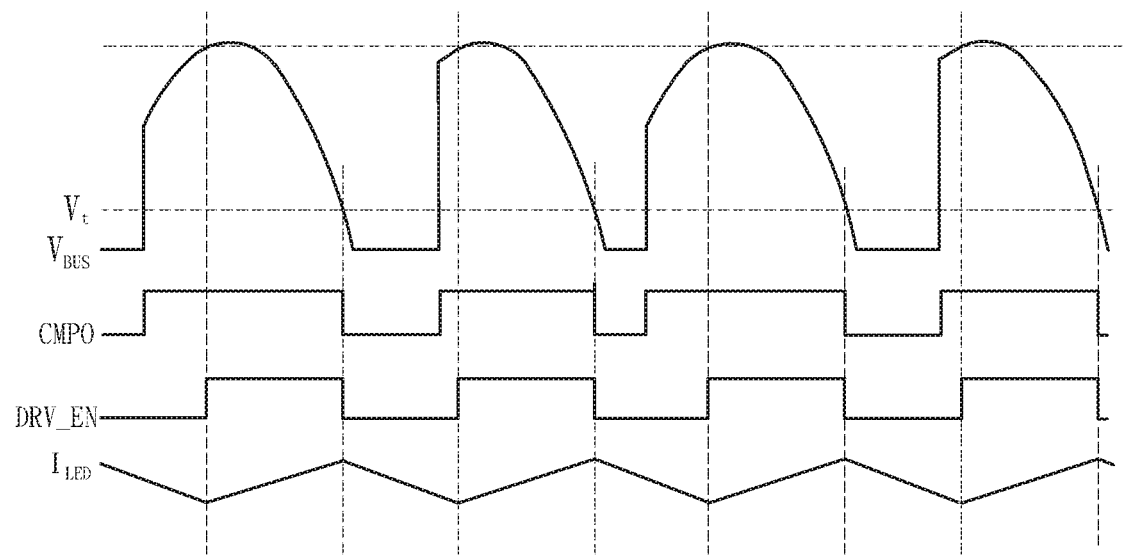
FIG. 13 shows a waveform schematic diagram of power supply signal $V_{BUS}$ indicating power supply line, detection signal CMPO, control signal DRV_EN output by a control unit and LED load current in the power control circuit shown in FIG. 11.
Figure 14:
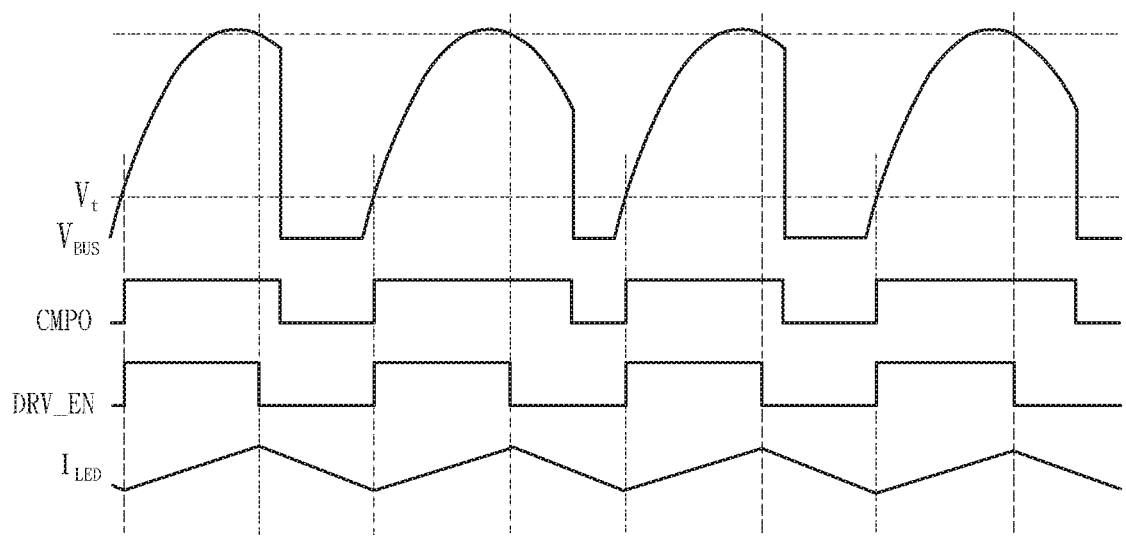
FIG. 14 shows a waveform schematic diagram of power supply signal $V_{BUS}$ reflecting a power supply line, detection signal CMPO, control signal DRV_EN output by a control unit and LED load current in the power control circuit shown in FIG. 12.

Please refer to FIG. 13 and FIG. 14 which respectively show waveform schematic diagrams of the voltage of the power supply signal ($V_{BUS}$) reflecting a power supply line, the detection signal (CMPO), the control signal (DRV_EN) output by a control unit and LED load current (ILED) in the power control circuit shown in FIG. 11 and FIG. 12 correspondingly. It can be seen from FIG. 3 and FIG. 13 (or FIG. 14) that, in each half cycle, changes of the LED load current (ILED) which is controlled by the power control circuit are uniform and the intervals of the LEF load current (ILED) in each unit interval are consistent, thereby the problem of stroboscopic phenomenon of lights is solved.

The present application further provides a chip, the chip is configured to provide a power control circuit to a circuit system in which a load is driven by a switch circuit. The power control circuit is as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and related description, and will not be described herein.

Figure 15:
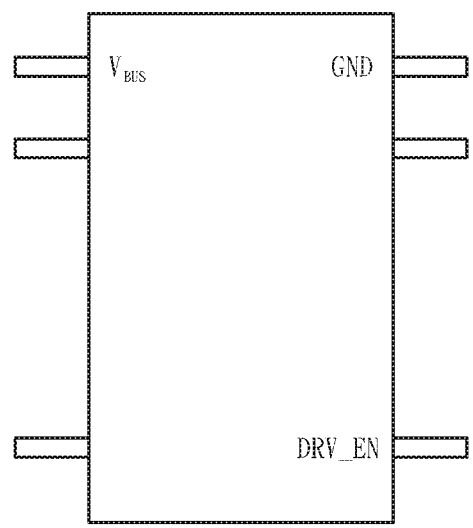
FIG. 15 shows a schematic diagram of packaging structure of a chip containing the above power control circuit.

Please refer to FIG. 15 which shows a schematic diagram of packaging structure of a chip containing the above power control circuit. The chip includes multiple pins, wherein the pins include a first pin ($V_{BUS}$) configured to sample signals reflecting the voltage on the power supply bus on which the load is located, a second pin (GND) configured to be grounded, and a third pin (DRV_EN) configured to output control signals. When a constant voltage source in the above power control circuit is an external power source, the chip further includes a fourth pin ($V_t$) configured to be connected with the constant voltage source, wherein the first pin ($V_{BUS}$) is coupled to a power supply bus in a circuit system and the corresponding access terminal of the switch circuit as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and corresponding descriptions. The power control circuit is connected with the control terminal or the input terminal of the switch circuit via the third pin (DRV_EN). For example, the power control circuit is connected with a control terminal (for example, a gate) of the switch unit in the switch circuit via the third pin, or connected with a control terminal (for example, an enable terminal) of the drive unit in the switch circuit.

In some embodiments, the power control circuit is integrated into a chip together with a linear compensation circuit. The linear compensation circuit is configured to output a linear compensation signal to the switch circuit based on acquired signal reflecting a power supply bus voltage, such that the switch circuit drives the load based on the linear compensation signal during the switch circuit is in a conductive state. Herein, the linear compensation line includes a sampling unit and a line voltage generating unit, wherein the sampling unit is connected with the power supply bus to converts the voltage signal of the power supply bus into a detection signal reflecting the voltage signal, and the sampling unit outputs the detection signal to the line voltage generating unit. The line voltage generating unit further outputs a linear voltage compensation signal to the switch circuit based on a reference voltage, wherein the linear voltage compensation signal changes reversely to the detection signal, The switch circuit controls the power supply bus to be conductive or non-conductive. In some embodiments, the linear compensation circuit is described in U.S. patent application Ser. No. 16/024,001 and will not be described in detail herein. Besides, in addition to the first pin, the second pin and the third pin, the chip integrated with the power control circuit and the linear voltage compensation circuit further comprises a fifth pin (CS) configured to sample voltage signals of the power supply bus, and a sixth pin configured to be connected to an input terminal of the switch circuit to output a linear compensation signal (Vref'). In order to improve integration levels of the power control circuit and the linear compensation circuit, the power control circuit and the linear compensation circuit share the pins on the chip, for example, the linear compensation circuit uses the first pin ($V_{BUS}$) to sample voltage signals of the power supply bus, and the power control circuit and the linear compensation circuit share the second pin (GND) and the fourth pin ($V_t$).

In some other embodiments, the power control circuit, the linear compensation circuit and at least part of the switch circuit are integrated into a chip. In one embodiment, the drive unit in the switch circuit is integrated into the chip. According to one of multiple connections between the power control circuit and the drive unit as described above, the output terminal of the power control circuit is connected to a control terminal of the drive unit, and the pins of the chip include the first pin, the second pin, the fifth pin as described above, and a seventh pin configured to connect an output terminal of the drive unit with a switch unit. In another embodiment, the drive unit and the switch unit in the switch circuit are all integrated into the chip. According to one of multiple connections between the power control circuit and the drive unit and the switch unit as described above, the output terminal of the power control circuit is connected with the control terminal of the switch unit. The pins of the chip include the first pin, the second pin, the fifth pin as described above, and an eighth pin and a ninth pin configured to connect an input terminal and an output terminal of the switch unit to the power supply bus.

Take LED lighting equipment as an example, the LED lighting equipment includes an LED light (the load), a rectifier, a switch circuit, a linear compensation circuit and a power control circuit. The switch circuit, the linear compensation circuit and the power control circuit are integrated into a chip. The chip, the rectifier and the LED light are all coupled to the power supply bus. The linear compensation circuit and the power control circuit in the chip are connected with the power supply bus via a pin ($V_{BUS}$) to acquire voltage signals, and are grounded via another pin (GND); and the input terminal and the output terminal of the switch circuit are connected to the power supply bus via corresponding pins, such that the power supply bus is controlled by the switch circuit to be conductive or non-conductive.

Figure 16:
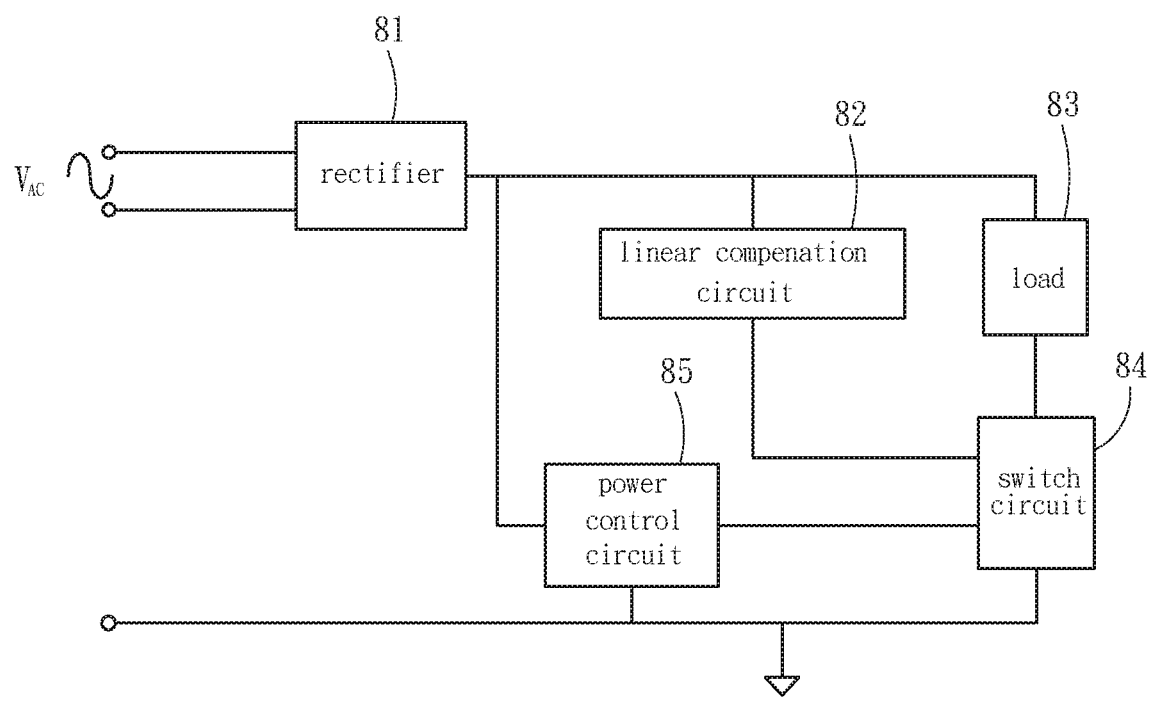
FIG. 16 shows a structural diagram of a drive system of the present application in one embodiment.

Please refer to FIG. 16 which shows a structural diagram of a drive system of the present application in one embodiment. The drive system includes a rectifier 81, a switch circuit 84, a linear compensation circuit 82 and a power control circuit 85.

The rectifier 81 is configured to rectify an alternating current (AC) and outputs the rectified AC to a power supply bus on which a load 83 is located. In one embodiment, the rectifier 81 includes a rectifier bridge constituted by four diodes which converts waveforms of the AC into power supply waveform which takes half of a power frequency cycle as a period.

The switch circuit 84 is arranged on the power supply bus and is configured to control the power supply bus to be conductive or non-conductive. The switch circuit 84 includes a drive unit and a switch unit. In one embodiment, he drive unit includes a driving amplifier, wherein an input terminal of the driving amplifier receives a drive control signal, and an output terminal of the driving amplifier is connected with the switch unit. The switch unit includes a switch power tube, wherein a gate of the switch power tube is connected with the output terminal of the driving amplifier, and a drain and a source of the switch power tube are connected with the power supply bus.

The output terminal of the linear compensation circuit 82 is connected to the input terminal of the drive unit in the switch circuit 84, and the linear compensation circuit 82 is configured to output a linear compensation signal to the switch circuit 84 arranged on the power supply bus based on acquired electric signal reflecting the power supply bus voltage, such that the switch circuit 84 drives the load 83 based on the linear compensation signal during the switch circuit 84 is in a conductive state. The linear compensation circuit 82 is configured to output the linear compensation signal to the switch circuit based on acquired signal reflecting a power supply bus voltage, such that the switch circuit drives the load 83 based on the linear compensation signal during the switch circuit is in a conductive state. The linear compensation circuit 82 includes a sampling unit and a line voltage generating unit. The sampling unit is connected to the power supply bus to convert the voltage signal of the power supply bus into a detection signal reflecting the voltage signal, and the sampling outputs the detection signal to the line voltage generating unit. The line voltage generating unit outputs a linear voltage compensation signal to the switch circuit based on a reference voltage, wherein the linear voltage compensation signal changes reversely to the detection signal. The switch circuit is configured to control the power supply bus to be in a conductive state of in a non-conductive state. In some embodiments, the linear compensation circuit is described in U.S. patent application Ser. No. 16/024,001, and will not be described in detail herein.

The power control circuit 85 is provided with an output terminal which is configured to be connected to the switch circuit 84, and the power control circuit 85 is configured to control the switch circuit 84 to be in a conductive state or a non-conductive state, so as to block fluctuation of phase angles when the phase-cut dimmer is conductive or non-conductive. The power control circuit is shown as FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and related description, and will not be described in detail herein. The power control circuit samples a voltage signal from the power supply bus and converts the voltage signal into a detection signal, and the power control circuit adjusts the time at which the switch circuit is conductive or non-conductive based on the detection signal, wherein the detection signal reflects the first waveform and second waveform of the power supply signal in a unit interval. Thus, when a load is operated based on the power supply signals provided by the phase-cut dimmer, stroboing of the load can be reduced.

Figure 17:
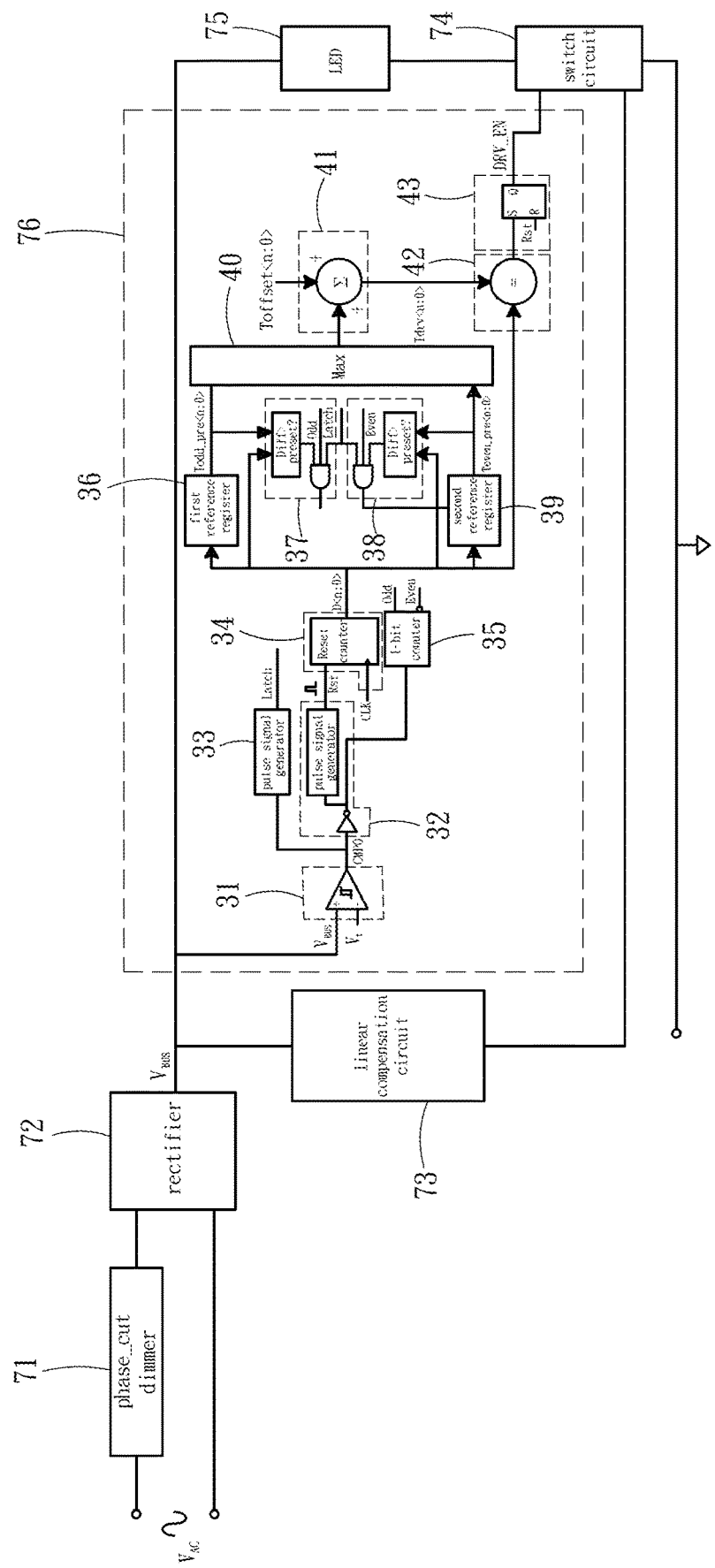
FIG. 17 shows a circuit schematic diagram of the drive system in one embodiment.

Take LED lighting equipment as an example, please refer to FIG. 17 which shows a circuit schematic diagram of the drive system in one embodiment. The LED lighting equipment is coupled to AC signals processed by a forward phase-cut dimmer 71. The LED lighting equipment includes an LED light 75 (a load), a rectifier 72, a switch circuit 74, a linear compensation circuit 73 and a power control circuit 76. The rectifier 72 rectifies the AC and outputs the rectified AC to a power supply bus. The switch circuit 74 includes a drive unit and a switch unit, wherein the drive unit includes a driving amplifier (A), and the switch unit includes a switch power tube (Mpwr). An output terminal of the driving amplifier (A) is connected to a gate of the switch power tube (Mpwr) and a drain and a source of the switch power tube (Mpwr) are coupled to a circuit loop on which the power supply bus is located. A sampling terminal of the linear compensation circuit 73 is connected with the power supply bus via a voltage division unit, and an output terminal of the linear compensation circuit 73 is connected with one input terminal of the driving amplifier (A). The another input terminal of the driving amplifier (A) is connected with a source of the switch power tube (Mpwr). An input terminal of the power control circuit 76 is connected to a drain of the switch power tube (Mpwr), and an output terminal of the power control circuit 76 is connected to the gate of the switch power tube (Mpwr).

The power control circuit 76 includes a timing unit, an updating unit, a regulating unit and a control unit. The timing unit includes a zero-crossing detector 31, a timer 34, a first logic module 32, a second logic module 33 and a third logic module 35.

A positive input terminal of the zero-crossing detector 31 receives a voltage of a power supply signal ($V_{BUS}$) output by a rectifier, a negative input terminal of the zero-crossing detector 31 receives a reference voltage ($V_t$) of the zero-crossing detection, and an output terminal of the zero-crossing detector 31 outputs a detection signal. A high level of detection signal represents that the forward phase-cut dimmer is in a conductive state, and a low level of detection signal represents that the forward phase-cut dimmer is in a non-conductive state. The first logic module 32 outputs the first control signal (Rst) at a falling edge of detection signal, the timer 34 resets and calculates the currently accumulated timing result within the current half cycle of the phase-cut AC power supply signal based on the first control signal, and the third logic module 35 counts in odd-even numbers based on a falling edge of detection signal to output an odd control signal or an even control signal. The second logic module 33 outputs an update control signal (Latch) based on a rising edge of the detection signal.

The updating unit includes a first updating module 37 and a second updating module 38, and the regulating unit includes a first reference register 36 and a second reference register 39 correspondingly. The first updating module 37 is connected to the first reference register 36, the timer 34, the second logic module 33 and the third logic module 35; and the second updating module 38 is connected to the second reference register 39, the timer 34, the second logic module 33 and the third logic module 35. According to the update control signal and the odd control signal, the first updating module 37 compares the currently accumulated timing result output by the timer 34 and a first reference time interval stored in the first reference register 36 and determines whether an first error therebetween is greater than a preset error threshold, if so, the currently accumulated timing result is stored in the first reference register so as to update the first reference time interval. According to the update control signal and the even control signal, the second updating module 38 compares the currently accumulated timing result output by the timer 34 and a second reference time interval stored in the second reference register 39 and determines whether a second error therebetween is greater than a preset error threshold, if so, the currently accumulated timing result is stored in the second reference register 39 so as to update the reference time interval.

The regulating unit further includes a selector 40, a regulating module 41 and a comparison module 42. The selector 40 selects a maximum value from the first reference time interval and the second reference time interval, and the selector 40 outputs the maximum value as an original reference time interval to the regulating module 41. The regulating module 41 sums the original reference time interval and a preset fluctuation time interval to output a result as a final reference time interval to the comparison module 42. The comparison module 42 compares the currently accumulated timing result with the final reference time interval, and determines whether the currently accumulated timing result is equal to the final reference time interval, if so, the comparison module 42 outputs the second control signal.

An output terminal of the control unit 43 is connected to a control terminal of the switch circuit. When the control unit 43 receives the first control signal, the control unit 43 outputs a non-conductive control signal to the control terminal of the switch circuit; and when the control unit 43 receives the second control signal, the control unit 43 outputs a conductive control signal to the control terminal of the switch circuit. The switch circuit performs a conductive operation according to the conductive control signal, or performs a non-conductive operation according to the disconnecting control signal.

Figure 18:
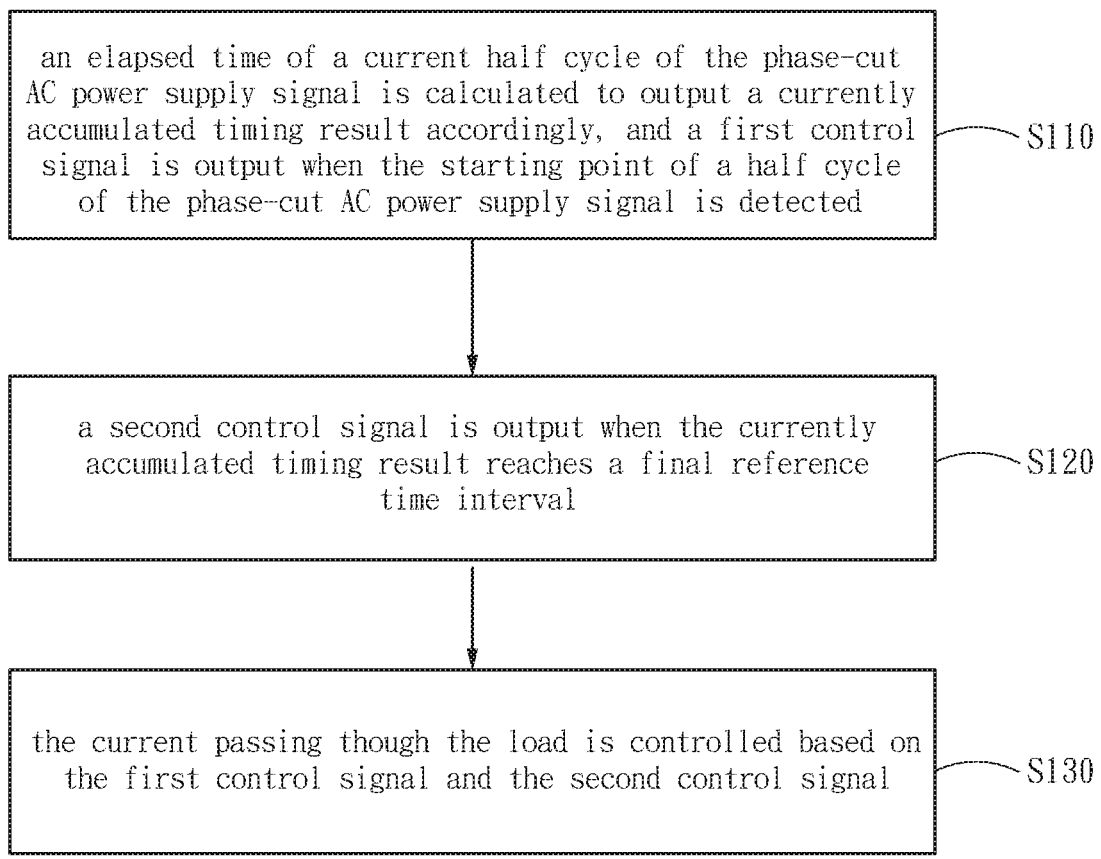
FIG. 18 shows a flow chart of a power control method of the present application in one embodiment.

Please refer to FIG. 18 which shows a flow chart of a power control method of the present application in one embodiment. The power control method is performed by the above power control circuit or by power control circuits which can operate the power control method.

In step S110, an elapsed time of a current half cycle of the phase-cut AC power supply signal is calculated to output a currently accumulated timing result accordingly, and a first control signal is output when the starting point of a half cycle of the phase-cut AC power supply signal is detected.

The step S110 is configured to calculate an elapsed time of the current half cycle of the phase-cut AC power supply signal and to output a currently accumulated timing result accordingly, and further to output a first control signal when a starting point of the half cycle of the phase-cut AC power supply signal is detected. The timing unit 21 is directly connected with a power supply line that is coupled to an output terminal of the rectifier, so as to acquire the voltage of the power supply signal ($V_{BUS}$), or acquire the voltage of the power supply signal ($V_{BUS}$) of the power supply line after voltage division is performed via a sampling resistor.

Herein, the timing unit 21 takes the unit interval as a timing period, and the timing unit 21 is configured to calculate a duration of the acquired power supply signal within the current unit interval and output the timed duration. During the calculation, the timing unit 21 further detects the starting point of a half cycle of the phase-cut AC power supply signal, and outputs the first control signal when the starting point is detected. Therefore, the timing unit 21 includes two circuit modules used for timing and detecting respectively, wherein the circuit module used for calculating is configured to determine a timing period in one unit interval through detecting the voltage of power supply signal ($V_{BUS}$), and output the currently accumulated timing result within the timing period. The circuit module used for detecting is configured to determine the starting point of a half cycle of the phase-cut AC power supply signal through detecting the voltage of power supply signal ($V_{BUS}$).

In order to simplifier the circuit structure, the step S110 includes step S111 and step S112, wherein the timing unit correspondingly includes a zero-crossing detector and a timer.

In step S111, a zero-crossing point of the DC power supply signal is detected, and a detection signal to indicate a first period corresponding to a first waveform and a second period corresponding to a second waveform is output.

The zero-crossing detector is configured to detect a zero-crossing point of the DC power supply signal, and output a detection signal for indicating the first period corresponding to the first waveform and the second period corresponding to the second waveform. In one embodiment, the zero-crossing detector includes a comparator, wherein one input terminal of the comparator receives the voltage of the power supply signal ($V_{BUS}$), and the other input terminal receives a reference voltage ($V_t$), and the comparator outputs a corresponding detection signal through comparing the voltage of the power supply signal ($V_{BUS}$) with the reference voltage ($V_t$). The detection signal is indicated by a high level and a low level. For example, a positive input terminal of the comparator receives the voltage of the power supply signal ($V_{BUS}$), and a negative input terminal receives the reference voltage ($V_t$), when the voltage of the power supply signal ($V_{BUS}$) is higher than the reference voltage ($V_t$), the comparator outputs a high level, otherwise, the comparator outputs a low level. With the comparator as an example, for the detection signal output by the zero-crossing detector, a high level represents the waveform of a phase-cut dimmer in the conductive period, and a low level represents the waveforms of the phase-cut dimmer in the non-conductive period.

It should be noted that, those skilled in the art should understand that, according to actual circuit design, the zero-crossing detector 211 uses the high level and the low level to correspondingly represent waveforms of the phase-cut dimmer in a non-conductive period and in a conductive period which are opposite to those shown above, which will not be described in detail herein.

In step S112, the elapsed time of the current half cycle of the phase-cut AC power supply signal is calculated according to a signal edge of the detection signal, and the first control signal to indicate the starting point of a half cycle of the AC power supply signal is output.

The timer is connected with the zero-crossing detector, and is configured to calculate the elapsed time of at least one of the first waveform and the second waveform within the current unit interval according to an edge of the detection signal. The timer is provided with a reset terminal, and reset is triggered based on a rising edge or a falling edge of the detection signal, the timer restarts to calculate after being resetting, and calculates the duration interval of corresponding power supply signal in each unit interval.

In some embodiments, the timer 213 performs calculating operation by counting the number of pulses of clock signals. In one embodiment, the timer 213 includes a counter, wherein the counter is connected with the zero-crossing detector 211 with a reset terminal and is configured to receive a clock signal with a clock terminal, and configured to count a number of pulses on the clock signal within the the current half cycle of the phase-cut AC power supply signal based on the signal edge of detected detection signal. For example, when a reset terminal of the counter receives a rising edge of pulse signal generated based on the signal edge of detection signal, the counter performs zero clearing in counting, and restarts to count the number of pulses of received clock signals from the falling edge of pulse signal.

In some other embodiments, the timer includes a timer which is designed based on an analogue circuit. The timer contains a capacitor and charging and discharging circuit thereof. The timer is connected with the zero-crossing detector, and charges the capacitor based on a signal edge of the detected detection signal, and determines the accumulated duration according to the peak voltage at which the capacitor is charged. For example, when a reset terminal of the counter receives a rising edge of pulse signal generated based on the signal edge of detection signal, the capacitor in the counter is discharged, and when a falling edge of the pulse signal is received, the capacitor starts to be charged. The voltage of the capacitor is processed by an analogue-digital converter and output as a voltage value represented by n which is a binary number (D<n:0>), wherein n is greater than 0, and based on a linear relationship between a preset capacitor capacity and a charging duration, the output voltage value represents the currently accumulated timing result.

Since the intervals accumulated in the first waveform in adjacent unit intervals of a phase-cut dimmer are different, in order to ensure that the time interval reset by the timer is the unit interval, those skilled in the art can design a signal edge of detection signal corresponding to resetting signal of the timer based on the type of the phase-cut dimmer. Please refer to FIG. 7 which shows waveform diagram of a power supply signal on a power supply line after being processed by a forward phase-cut dimmer and a rectifier and waveform diagram of a detection signal output by a zero-crossing detector. As shown in FIG. 7, for the forward phase-cut dimmer, the falling edge of the detection signal is correspond to that the forward phase-cut dimmer terminates the conductive state and there is no phase fluctuation, therefore, the reset terminal of the timer is valid at the falling edge of the detection signal. Please refer to FIG. 8 which shows waveform diagram of a power supply signal on a power supply line after being processed by a rearward phase-cut dimmer and a rectifier and waveform diagram of a detection signal output by a zero-crossing detector. As shown in the FIG. 8, for the rearward phase-cut dimmer, the rising edge of the detection signal is correspond to that the rearward phase-cut dimmer starts the conductive state and there is no phase fluctuation, therefore, the reset terminal of the timer is valid at the rising edge of the detection signal.

It should be noted that, since the waveforms of power supply signals processed by the forward phase-cut dimmer and the rearward phase-cut dimmer are different, the first waveform and the second waveform in the present application can be distinguished according to the starting point which is used to accurately time the unit interval. A waveform starting from the starting point in the power supply waveform within one unit interval is called the first waveform, and the first waveform is turned into the second waveform after a phase-cut processing is performed by the phase-cut dimmer. In the power supply signal as shown in FIG. 7, a waveform output by the forward phase-cut dimmer in its non-conductive period is called the first waveform, and a waveform output by the forward phase-cut dimmer in its conductive period is called the second waveform. In the power supply signal as shown in FIG. 8, a waveform output by the rearward phase-cut dimmer in its conductive period is called the first waveform, and a waveform output by the rearward phase-cut dimmer in its non-conductive period is called the second waveform. Correspondingly, the timer starts to calculate the the elapsed time of the current half cycle of the phase-cut AC power supply signal from the signal edge corresponding to the starting point of the half cycle of the AC power supply signal.

In some embodiments, please referring to FIG. 6, the step S112 is performed by the first logic module and the timer.

The first logic module is connected to the zero-crossing detector, and is configured to output the first control signal (Rst) to indicate the starting point of the half cycle of the AC power supply signal based on the signal edge of the detection signal. Based on the type of phase-cut dimmer, the first waveform is related to the control logic represented by the first control signal (Rst). For example, if the first waveform is the waveform of the forward phase-cut dimmer in a non-conductive state, the first control signal (Rst) is used for instructing the control unit to disconnect the switch circuit in the circuit system, such that the current passing through the load declines from its peak value. For another example, if the first waveform is the waveform of the rearward phase-cut dimmer in a conductive state, the first control signal (Rst) is used for instructing the control unit to conduct the switch circuit in the circuit system, such that the current flowing through the load rises from its peak value.

Herein, the first logic module is designed according to the first waveform and second waveform which are respectively represented by a high level and a low level output by the zero-crossing detector, such that the first logic module detects a signal edge corresponding to the starting point of the first waveform and outputs the first control signal (Rst). In one embodiment, as shown in FIG. 7, the low level output by the zero-crossing detector represents the first waveform, and the high level represents the second waveform. The first logic module outputs the first control signal (Rst) at a falling edge of detection signal. Correspondingly, the first logic module includes a pulse signal generator which is triggered based on a falling edge; or the first logic module includes an inverter and a pulse signal generator which is triggered based on a rising edge. The first control signal (Rst) output by the first logic module is the pulse signal. In another embodiment, as shown in FIG. 8, the high level output by the zero-crossing detector represents the first waveform, the low level represents the second waveform, and the first logic module outputs the first control signal (Rst) at a rising edge of the detection signal. Correspondingly, the first logic module includes a pulse signal generator which is triggered based on a rising edge; or the first logic module includes an inverter and a pulse signal generator which is triggered based on a falling edge. The first control signal (Rst) output by the first logic module is the pulse signal.

It should be noted that, the structure of the first logic module is merely exemplary, rather than limiting the present application. In fact, the first logic module can be designed according to the first waveform and the second waveform corresponding to the high level and the low level of the received detection signals.

As the timer calculates the current unit interval based on the signal edge at the starting point of the first waveform, the reset terminal of the timer is connected with an output terminal of the first logic module, and the timer resets the current timing operation based on the first control signal (Rst) output from the first logic module. The manners through which the timer resets and restarts to time based on the first control signal (Rst) are the same as or similar to those described above, and will not be described herein.

The regulating unit is connected with the timing unit, and the regulating unit includes a register which stores a reference time interval. The reference time interval is a duration which is preset based on the duration during which the phase-cut dimmer is in the conductive state or in the non-conductive state. According to the first waveform detected by the timing unit, the reference time interval is determined based on the duration during which the first waveform is shown in the unit interval and stored in the register. In some embodiments, the reference time interval is set on basis of the duration during which the first waveform is shown and with the phase angle interval as an error range in order to block the phase angle interval in which the fluctuation is occurred nearby phase angles when the phase-cut dimmer is conductive or non-conductive. Take the forward phase-cut dimmer as an example, if the first waveform is correspond to the waveform when the forward phase-cut dimmer is in a non-conductive state, the reference time interval is the sum of the duration during which the first waveform is shown and a preset duration of the phase angle interval. Take the rearward phase-cut dimmer as an another example, if the first waveform is correspond to the waveform when the rearward phase-cut dimmer is in a conductive state, the reference time interval is the difference between the duration during which the first waveform is shown and a preset duration of the phase angle interval.

In other embodiments, in order to response to the dimming operation of the phase-cut dimmer, the register stores multiple reference time intervals corresponding to adjustable gears, and the corresponding reference time interval is selected based on the gear signal, i.e. PWM signal or digital signal, provided by the phase-cut dimmer.

In some other embodiments, in order to response to the dimming operation of the phase-cut dimmer, the reference time interval is updated timely based on the dimming operation of the phase-cut dimmer. The power control method further comprises the following steps: outputting an update control signal at an end point of the first waveform during a half cycle of the phase-cut AC power supply signal; detecting an error between a currently accumulated timing result and an original reference time interval stored temporarily updating the original reference time interval when the error exceeds a preset error threshold. The timing unit further includes a second logic module; and the power control circuit further includes an updating unit.

The second logic module is configured to output an update control signal at the ending point of the first waveform. Herein, the second logic module detects the ending point of the first waveform based on the signal edge of the detection signal output by the zero-crossing detector and output the update control signal. In one embodiment, please refer to FIG. 9 which shows a circuit structural diagram of the timing unit 21 in the power control circuit of a forward phase-cut dimmer. For a detection signal (CMPO) output by the zero-crossing detector 211, a low level represents the first waveform, and a high level represents the second waveform. The second logic module 214 determines the ending point of the first waveform based on a rising edge of the detection signal, wherein the second logic module 214 includes a rising edge-based pulse signal generator. In another embodiment, please refer to FIG. 10 which shows a circuit structural diagram of a timing unit 21' in a power control circuit of a rearward phase-cut dimmer. For the detection signal output by a zero-crossing detector 211', a high level represents the first waveform, and a low level represents the second waveform. A second logic module 214' determines the ending point of the first waveform based on a falling edge of the detection signal, wherein the second logic module 214' includes a falling edge-based pulse signal generator.

As shown in FIG. 9 and FIG. 10, the updating unit 24 is connected with the timing unit 21 (or 21') and a register 221, and the updating unit 24 is configured to detect the error between the first time interval during which the first waveform is shown and the reference time interval stored temporarily based on a control logic determined through combining the update control signal (Latch), and update the reference time interval in the register when the error exceeds a preset error threshold.

The updating unit 24 is connected to a second logic module 214 (or 214') and a timer 213 (or 213'), and is configured to read the timing result currently accumulated by the timer 213 (or 213') when receiving the update control signal (for example, pulse signal), and compare the timing result with the reference time interval, and take the timing result as a reference time interval based on which the current of a load in subsequent unit interval is regulated when an absolute value of the compared result exceeds a preset error threshold. Therefore, the updating unit 24 includes multi-level logic module which includes a comparator and a logic device group, or a logic processing module containing MCU.

In a circuit system which includes a dimmer detector, the updating unit further selects an updated reference time interval based on a detection signal representing type of dimmer provided by the dimmer detector and the update control signal. For example, based on the update control signal and detection signal representing type of dimming in the forward phase-cut dimmer, the updating unit detects whether the error between a reference time interval corresponding to the forward phase-cut dimmer and the timing result during which the first waveform is shown exceeds an error threshold corresponding to the forward phase-cut dimmer, if so, corresponding reference time interval is updated, if not, corresponding reference time interval is not updated. For another example, based on the update control signal and detection signal representing type of dimming in the rearward phase-cut dimmer, the updating unit detects whether the error between a reference time interval corresponding to the rearward phase-cut dimmer and the timing result during which the first waveform is shown exceeds an error threshold corresponding to the rearward phase-cut dimmer, if so, corresponding reference time interval is updated, if not, corresponding reference time interval is not updated. Since the durations during which the phase-cut dimmer is in a conductive state in front half of the power frequency cycle and in rear half of the power frequency cycle are not the same, the error threshold set in the updating unit is redundant with a difference of the first waveform in adjacent unit intervals, so as to lower updating frequency and reduce discomfortableness of human eyes caused by stroboscopic phenomenon of lights.

Under the condition that the durations during which the phase-cut dimmer is in a conductive state in front half of the power frequency cycle and in rear half of the power frequency cycle are not the same, the register includes a first reference register and a second reference register which are respectively configured to temporarily store reference time intervals (T1) within a unit interval corresponding to odd times and reference time intervals (T2) within a unit interval corresponding to even times which are determined through detection. The regulating unit further includes a selector which is connected with both the first reference register and the second reference register, and the selector is configured to select either first reference register or the second reference register as an original reference time interval applied to adjust the output time of the second control signal.

The first reference time interval and the second reference time interval respectively stored in the first reference register and the second reference register are stored by the ways described above correspondingly, and will not be described herein.

The selector sets a selection logic according to a conductive state or non-conductive state of the phase-cut dimmer indicated by the first waveform. In one embodiment, the first waveform indicates that the waveform of the forward phase-cut dimmer is in a non-conductive state, the selector selects a larger one from two reference time intervals. In another embodiment, the first waveform indicates that the waveform of the rearward phase-cut dimmer is in a conductive state, the selector selects a smaller one from two reference time intervals. In view of this, not only fluctuation of the phase angle interval can be avoided, but also the conduction time interval within each unit interval can be unified.

For updating each reference time interval in the first reference register and the second reference register, in some embodiments, the timing unit 21 further includes a third logic module, wherein the third logic module is configured to output an odd control signal and an even control signal when the starting point of the first waveform is detected. The updating unit updates the first reference register or second reference register based on the odd control signal or the even control signal correspondingly. In some embodiments, the updating unit correspondingly includes a first updating module and a second updating module. The first updating module is connected to the first reference register, the second logic module and the third logic module, and the first updating module is configured to detect a first error between the currently accumulated timing result and the first reference time interval stored in the first reference register at least based on the update control signal and the odd control signal, and to update the first reference time interval in the first reference register when the first error exceeds a first preset error threshold. The second updating module is connected to the second reference register, the second logic module and the third logic module, and the second updating module is configured to detect a second error between the currently accumulated timing result and the second reference time interval at least based on the update control signal and the even control signal, and to update the second reference time interval in the second reference register when the second error exceeds a preset error threshold.

For example, the third logic module includes a 1-bit counter and receives pulse signals output from the first logic module, wherein the 1-bit counter counts based on the pulse signals. The first updating module includes a logic device group which performs logic processing based on the update control signal, the first control signal and the odd control signal. The second updating module includes a logic device group which performs logic processing based on the update control signal, the first control signal and the even control signal. When the counted number is an odd number, the odd control signal (such as a high level) is output, and when the counted number is an even number, the even control signal (such as a low level) is output. Take the first updating module as an example, when the update control signal and the odd control signal are all high level, the first updating module detects a first error between the currently accumulated timing result and the first reference time interval stored in the first reference register, and updates the first reference time interval in the first reference register when the first error exceeds a preset error threshold. The working process of the second updating module is similar to that of the first updating module and will not be described herein.

In step S120, a second control signal is output when the currently accumulated timing result reaches a final reference time interval.

Herein, the step S120 is performed by a regulating unit. When the currently accumulated timing result reaches the reference time interval, the regulating unit outputs the second control signal. The reference time interval is the updated reference interval which is updated by the updating unit, thereby dimming operations of users on the phase-cut dimmer can be responsed in real time.

According to the type of phase-cut dimmer, when the currently accumulated timing result reaches the reference time interval, it is indicated that, based on the first control signal, the load can avoid the power supply signal in phase angle interval in which the fluctuation is occurred nearby phase angles at which the phase-cut dimmer is conductive or non-conductive. When the currently accumulated timing result of the timing unit reaches the reference time interval, the regulating unit outputs the second control signal.

In one embodiment, the regulating unit further includes a comparison module. The comparison module performs a bit-by-bit comparison in real time on a binary number which is output by the timing unit and is used for describing the currently accumulated timing result and a binary number which is used for describing the reference time interval stored temporarily. When a compared result shows that the two numbers are equal, the comparison module outputs the second control signal. The comparison module includes a plurality of comparators and a logic device group, wherein each comparator compares the binary number corresponding to the timing result and the binary number corresponding to the reference time interval, and the output terminals of all the comparators are connected with the logic device group. When the levels output by all the comparators conform to a logic based on which the logic device group outputs the second control signal, the second control signal is output. Herein, as required by actual logic design, the logic device group includes at least one logic device, and corresponding logic configuration is realized through electric connection between each logic device. The logic device includes but is not limited to an AND gate, an OR gate, a NAND gate, a NOT gate, an encoder, a decoder and a selector.

In some of the embodiments mentioned above, the reference time interval is obtained based on the detection of the duration during the elapsed time of the first waveform. In order to avoid duration corresponding to the phase angle interval in which the fluctuation is occurred, the regulating unit further includes a regulating module which is configured to incorporate a fluctuation time interval which is prestored in a register with the original reference time interval to generate the reference time interval, and provide the reference time interval to the comparison module.

In one embodiment that the first waveform is detected as a waveform of the forward phase-cut dimmer which is in a non-conductive state, the regulating module includes an adder which is configured to add the fluctuation time interval into the original reference time interval, and provide the result to the comparison module, so that the load circuit can be in a state with no power input within the phase angle interval in which the fluctuation is occurred. In another embodiment that the first waveform is detected as a waveform of the rearward phase-cut dimmer which is in a non-conductive state, the regulating module includes a subtractor which is configured to subtract the fluctuation time interval from the reference time interval, and provide the result to the comparison module, so that the load circuit can be in a state with no power input within the phase angle interval in which the fluctuation is occurred.

In step S130, the current passing though the load is controlled based on the first control signal and the second control signal.

Herein, the step S130 is performed by a control unit. The control unit is connected to the timing unit and the regulating unit, and is configured to control the current passing through the load based on the first control signal and the second control signal.

The control unit outputs a control signal to control the circuit system according to a circuit structure thereof, wherein the circuit system is used to control the power supply of the load. Specifically, the control unit outputs an enable signal which is used for controlling the circuit system to conduct or disconnect a circuit loop of the load. For the forward phase-cut dimmer, the control unit outputs an enable signal to control the circuit system to be in a non-conductive state based on the first control signal, and the control unit outputs an enable signal tp control the circuit system to be in a conductive state based on the second control signal. For the rearward phase-cut dimmer, the control unit outputs an enable signal to control the circuit system to be in a conductive state based on the first control signal, and the control unit outputs an enable signal to control the circuit system to be in a non-conductive state based on the second control signal.

In a circuit system in which the power supply of a load is controlled by a switch circuit, the control unit controls the switch circuit to be conductive or non-conductive based on the first control signal and second control signal. An output terminal of the control unit is connected with a control terminal of the switch circuit. The control terminal includes a control terminal of a switch unit in the switch circuit (for example, a gate of a switch power tube), or a control terminal of a drive unit in the switch circuit (for example, an enable terminal of a driving amplifier). In a case of the phase-cut dimmer is a forward phase-cut dimmer, the switch unit includes a gate-driven switch power tube, and the control unit includes a trigger and a switch device, wherein a set terminal of the trigger receives the second control signal, a reset terminal of the trigger receives the first control signal, and an output terminal of the trigger is connected with a control terminal of the switch device. When the reset terminal of the trigger receives the first control signal, the trigger outputs a low level to control the switch device to be conductive, such that the switch power tube is forcibly turned off; and when the set terminal of the trigger receives the second control signal, the trigger outputs a high level to control the switch device to be non-conductive, such that the switch power tube is turned on, wherein the switch power tube can be also controlled by other switch control circuits in the circuit system. In a case of the phase-cut dimmer is a rearward phase-cut dimmer, the switch device includes a gate-driven switch power tube, the control unit includes a trigger and a switch device, wherein a set terminal of the trigger receives the first control signal, the reset terminal of the trigger receives the second control signal, and an output terminal of the trigger is connected with a control terminal of the switch device. When the set terminal of the trigger receives the first control signal, the trigger outputs a high level to control the switch device is controlled to be non-conductive, such that the switch power tube is turned on, wherein the switch power tube can be also controlled by other switch control circuits in the circuit system. When the reset terminal of the trigger receives the second control signal, the trigger outputs a low level to control the switch device to be conductive, such that the switch power tube is forcibly turned off.

In one embodiment, an output terminal of the control unit is connected to an input terminal of the switch circuit, wherein the input terminal of the switch circuit is connected to an input terminal of the drive unit (for example, an input terminal of a driving amplifier). For example, the output terminal of the control unit is connected to the input terminal of the driving amplifier, and when the control unit controls the input terminal of the driving amplifier to be grounded based on the first control signal or second control signal which is used for disconnecting the switch circuit, the switch circuit is forcibly disconnected, otherwise, the switch circuit is conductive or is controlled by other circuits.

The other circuits include but are not limited to a switch control circuit which provides stable power supply for a load by using resonance, and a line voltage compensation circuit.

It should be noted that, the connection and circuit structure of the above control unit are merely exemplary, rather than limiting the present application. In fact, the control unit can perform more complex logic processing and output a conductive control signal or a non-conductive signal through combining with control logics of control signals of other switch circuits, which will not be described in detail herein.

Figure 19:
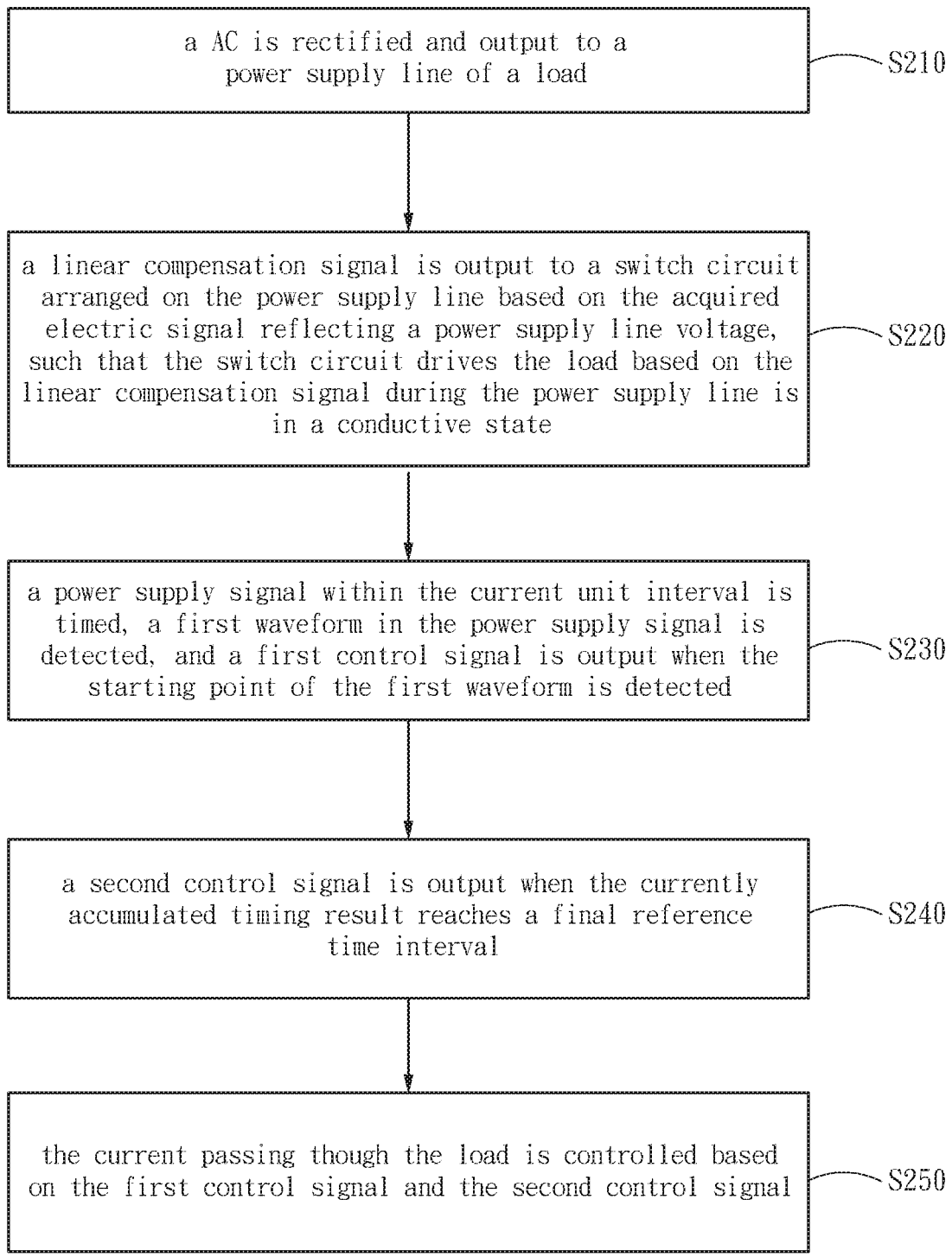
FIG. 19 shows a flow chart of a drive method in the present application.

Please refer to FIG. 19 which shows a flow chart of a drive method in the present application. The drive method is performed by the above drive system or by drive systems which can implement the method.

In step S210, a AC is rectified and output to a power supply line of a load.

Herein, the step S210 is performed by a rectifier. The rectifier is configured to rectify a AC and outputs the rectified AC to a power supply bus on which the load is located. In one embodiment, the rectifier includes a rectifier bridge constituted by four diodes which converts waveforms of the AC into power supply waveform which takes half of a power frequency cycle as a period.

In step S220, a linear compensation signal is output to a switch circuit arranged on the power supply line based on the acquired electric signal reflecting a power supply line voltage, such that the switch circuit drives the load based on the linear compensation signal during the power supply line is in a conductive state.

Herein, the step S220 is performed by a linear compensation circuit. The output terminal of the linear compensation circuit is connected to the input terminal of the drive unit in a switch circuit, and the linear compensation circuit is configured to output a linear compensation signal to the switch circuit arranged on the power supply bus based on acquired electric signal reflecting the power supply bus voltage, such that the switch circuit drives the load based on the linear compensation signal during the switch circuit is in a conductive state.

The switch circuit is arranged on the power supply bus and is configured to control the power supply bus to be conductive or non-conductive. The switch circuit 84 includes a drive unit and a switch unit. In one embodiment, he drive unit includes a driving amplifier, wherein an input terminal of the driving amplifier receives a drive control signal, and an output terminal of the driving amplifier is connected with the switch unit. The switch unit includes a switch power tube, wherein a gate of the switch power tube is connected with the output terminal of the driving amplifier, and a drain and a source of the switch power tube are connected with the power supply bus.

The linear compensation circuit is configured to output a linear compensation signal to the switch circuit based on acquired signal reflecting a power supply bus voltage, such that the switch circuit can drive the load based on the linear compensation signal during the switch circuit is in a conductive state. The linear compensation line includes a sampling unit and a line voltage generating unit. The sampling unit is connected to the power supply bus to convert the voltage signal of the power supply bus into a detection signal reflecting the voltage signal, and the sampling outputs the detection signal to the line voltage generating unit, and based on a reference voltage, the line voltage generating unit outputs a linear voltage compensation signal to the switch circuit based on a reference voltage, wherein the linear voltage compensation signal changes reversely to the detection signal. The switch circuit is configured to control the power supply bus to be in a conductive state of in a non-conductive state. In some embodiments, the linear compensation circuit is described in U.S. patent application Ser. No. 16/024,001, and will not be described in detail herein.

In step S230, a power supply signal within the current unit interval is timed, a first waveform in the power supply signal is detected, and a first control signal is output when the starting point of the first waveform is detected.

In step S240, a second control signal is output when the currently accumulated timing result reaches a final reference time interval.

In step S250, the current passing though the load is controlled based on the first control signal and the second control signal.

The step S230, step S240, and step S250 are correspond to step S110, step S120 and step-S130 as shown in FIG. 18. In addition, all of the embodiments described in FIG. 18 are cited by reference herein and will not be described herein.

In one embodiment, the power control circuit is provided with an output terminal which is configured to be connected to the switch circuit, and the power control circuit is configured to control the switch circuit to be in a conductive state or a non-conductive state, so as to block fluctuation of phase angles when the phase-cut dimmer is conductive or non-conductive. The power control circuit samples a voltage signal from the power supply bus and converts the sampled voltage signal into a detection signal, and the power control circuit adjusts the time at which the switch circuit is conductive or non-conductive based on the detection signal, wherein the detection signal reflects the first waveform and second waveform of the power supply signal in a unit interval. Thus, when a load is operated based on the power supply signals provided by the phase-cut dimmer, stroboing of the load can be reduced.

Above all, the power control method in the present application have the following beneficial effects: through detecting a first waveform in the waveform of a power supply signal within the current unit interval, and blocking a time interval in which a transition between the first waveform and the second waveform occurs (a time interval in which fluctuation of a phase angle occurs because of the phase-cut dimmer switches to a conductive state or a non-conductive state) the problem that the stroboscopic phenomenon can be occurred in an LED lighting equipment can be solved.

What is claimed is:

1. A power control circuit utilized in a circuit system, wherein the circuit system is configured to apply a phase-cut alternating current (AC) power signal processed by a phase-cut dimmer to drive a load, and wherein the power control circuit is coupled to a power supply line at an output side of a rectifier in the circuit system, wherein the rectifier converts the phase-cut AC power signal into a direct current (DC) power supply signal which has a first waveform and a second waveform during a half cycle of the phase-cut AC power signal, the power control circuit comprising:
    a timing unit, configured to calculate an elapsed time of a current half cycle of the phase-cut AC power supply signal and to output a currently accumulated timing result accordingly, and further to output a first control signal when a starting point of a half cycle of the phase-cut AC power supply signal is detected;
    a regulating unit, connected to the timing unit, and the regulating unit comprising a register, wherein the register is configured to store a final reference time interval, and wherein the regulating unit is configured to output a second control signal when the elapsed time of the current half cycle of the phase-cut AC power supply signal reaches the final reference time interval; and a control unit, connected to the timing unit and the regulating unit, and the control unit configured to control a current passing through the load based on the first control signal and the second control signal.

2. The power control circuit of claim 1, wherein the timing unit comprises a zero-crossing detector, a timer connected to the zero-crossing detector, and a first logic module connected to the zero-crossing detector, wherein the zero-crossing detection module is configured to detect a zero-crossing point of the DC power supply signal and output a detection signal to indicate a first period corresponding to the first waveform and a second period corresponding to the second waveform; and wherein the a timer is configured to calculate the elapsed time of the current half cycle of the phase-cut AC power supply signal according to a signal edge of the detection signal; and wherein the first logic module is configured to output the first control signal to indicate the starting point of a half cycle of the phase-cut AC power supply signal and a switching point of based on the signal edge of the detection signal.

3. The power control circuit of claim 2, wherein the timer comprises one of a digital timer or an analog timer, wherein the digital timer comprises a counter connected to the zero-crossing detector with a reset terminal, and further to receive a clock signal with a clock terminal, and the counter is configured to count a number of pulses on the clock signal within the current half cycle of the phase-cut AC power supply signal based on the signal edge of the detection signal; and wherein the analog timer comprises a capacitor connected to the zero-crossing detector, and the capacitor is charged based on the signal edge of the detection signal, and wherein the analog timer determines an elapsed time of the current half cycle of the phase-cut AC power supply signal according to a peak voltage crossing the capacitor.

4. The power control circuit of claim 2, wherein the first logic module is further connected to a reset terminal of the timer, and wherein the timer is reset based on the first control signal.

5. The power control circuit of claim 1, wherein the control unit is configured to control a switch circuit to enter into a conductive state or a non-conductive state based on the first control signal and the second control signal.

6. The power control circuit of claim 1, wherein the timing unit comprises a second logic module configured to output an update control signal at an end point of the first wave form during a half cycle of the phase-cut AC power supply signal, and wherein the power control circuit further comprises an updating unit connected to the timing unit and the register, and wherein the updating unit is configured to detect an error between a duration of the first waveform during the current half cycle of the phase-cut AC power supply signal and an original reference time interval stored temporarily, and to update the original reference time interval when the error exceeds a preset error threshold.

7. The power control circuit of claim 1, wherein the register comprises a first reference register and a second reference register, and wherein the first reference register and the second reference register are respectively configured to temporarily store a first reference time intervals corresponding to odd half cycles of the phase-cut AC power supply signal and a second reference time interval corresponding to even half cycles of the phase-cut AC power supply signal; and wherein the regulating unit further comprises a selector connected to the first reference register and the second reference register, and the regulating unit is configured to select either the first reference time interval or the second reference time interval as an original reference time interval applied to determine the final reference time interval.

8. The power control circuit of claim 7, wherein the timing unit comprises a second logic module and a third logic module, and wherein the second logic module is configured to output an update control signal at an ending point of the first waveform during a half cycle of the phase-cut AC power supply signal, and wherein the third logic module is configured to output an odd control signal and an even control signal when the starting point of a half cycle of the phase-cut AC power supply signal is detected; and wherein the power control circuit further comprises an updating unit which comprises a first updating module and a second updating module; and wherein the first updating module is connected to the first reference register, the second logic module and the third logic module, and the first updating module is configured to detect a first error between the currently accumulated timing result and the first reference time interval at least based on the update control signal and the odd control signal, and to update the first reference time interval in the first reference register when the first error exceeds a first preset error threshold; and wherein the second updating module is connected to the second reference register, the second logic module and the third logic module, and the second updating module is configured to detect a second error between the currently accumulated timing result and the second reference time interval at least based on a the update control signal and the even control signal, and to update the second reference time interval in the second reference register when the second error exceeds a second preset error threshold.

9. The power control circuit of claim 1, wherein the regulating unit further comprises a comparison module connected to the timing unit and configured to compare the currently accumulated timing result with the final reference time interval and to accordingly output the second control signal.

10. The power control circuit of claim 9, wherein the register is further configured to store a fluctuation time interval, and wherein the regulating unit further comprises a regulating module configured to incorporate the fluctuation time interval with the original reference time interval to generate the final reference time interval and provide the final reference time interval to the comparison module.

11. A drive system, comprising:
a rectifier, configured to converting a phase-cut alternating current (AC) power signal into a direct current (DC) power supply signal;
a switch circuit, arranged in a switching power supply and configured to switch between a conductive state and a non-conductive state; and
the power control circuit of claim 1, configured to control the switching circuit.

12. A power control method, utilized in a circuit system wherein the circuit system is configured to apply a phase-cut alternating current (AC) power signal processed by a phase-cut dimmer to drive a load, the power control method comprises:
calculating an elapsed time of a current half cycle of the phase-cut AC power supply signal to output a currently accumulated timing result accordingly, and further outputting a first control signal when a starting point of a half cycle of the phase-cut AC power supply signal is detected;

outputting a second control signal when currently accumulated timing result reaches a final reference time interval; and controlling a current passing through the load based on the first control signal and the second control signal.

13. The power control method of claim 12, wherein the step of calculating an elapsed time of a current half cycle of the phase-cut AC power supply signal to output a currently accumulated timing result accordingly, and further outputting a first control signal when a starting point of a half cycle of the phase-cut AC power supply signal is detected further comprises the following steps:

detecting a zero-crossing point of the DC power supply signal and output a detection signal to indicate a first period corresponding to a first waveform and a second period corresponding to a second waveform; and calculating the elapsed time of the current half cycle of the phase-cut AC power supply signal according to a signal edge of the detection signal; and outputting the first control signal to indicate the starting point of a half cycle of the AC power supply signal.

14. The power control method of claim 12, wherein the power control method further comprising the steps of:

outputting an update control signal at an end point of the first waveform during a half cycle of the phase-cut AC power supply signal; and detecting an error between a currently accumulated timing result and an original reference time interval stored temporarily updating the original reference time interval when the error exceeds a preset error threshold.

15. The power control method of claim 12, wherein the power control method further comprising: temporarily storing a first reference time intervals corresponding to odd half cycles of the phase-cut AC power supply signal and a second reference time interval corresponding to even half cycles of the phase-cut AC power supply signal; selecting either the first reference time interval or the second reference time interval as an original reference time interval applied to determine the final reference time interval.

16. The power control method of claim 12, wherein the step of outputting a second control signal when the currently accumulated timing result reaches a final reference time interval comprises a step of comparing the currently accumulated timing result with the final reference time interval to output the second control signal accordingly.

17. The power control method of claim 16, wherein the step of outputting the second control signal when the currently accumulated timing result reaches a final reference time interval further comprises a step of incorporating a fluctuation time interval with the original reference time interval to generate the final reference time interval.

18. The power control method of claim 15, wherein the power control method further comprising the steps of:

outputting an update control signal at an ending point of the first waveform, and outputting an odd control signal and an even control signal when the starting point of a half cycle of the AC power supply signal is detected;

detecting a first error between the currently accumulated timing result and a first reference time interval at least based on the update control signal and the odd control signal to update the first reference time interval when the first error exceeds a first preset error threshold; and detecting a second error between the currently accumulated timing result and a second reference time interval at least based on the update control signal and the even control signal to updating the second reference time interval when the second error exceeds a second preset error threshold.

\* \* \* \* \*